United States Patent [19]

Tahara et al.

[11] Patent Number: 5,286,582
[45] Date of Patent: Feb. 15, 1994

[54] MONAQUEOUS ELECTROLYTE SECONDARY BATTERY AND PROCESS FOR PRODUCING POSITIVE ACTIVE MATERIALS

[75] Inventors: Kensuke Tahara; Hideki Ishikawa; Tsugio Sakai, all of Sendai, Japan

[73] Assignee: Seiko Electronic Components Ltd., Japan

[21] Appl. No.: 786,431

[22] Filed: Nov. 1, 1991

[30] Foreign Application Priority Data

| Nov. 2, 1990 | [JP] | Japan | 2-298213 |
| Dec. 21, 1990 | [JP] | Japan | 2-405204 |
| Dec. 21, 1990 | [JP] | Japan | 2-405205 |
| Apr. 23, 1991 | [JP] | Japan | 3-92462 |
| May 13, 1991 | [JP] | Japan | 3-107677 |
| Jun. 11, 1991 | [JP] | Japan | 3-139246 |
| Oct. 1, 1991 | [JP] | Japan | 3-253921 |

[51] Int. Cl.$^5$ ............ H01M 4/48; H01M 4/52
[52] U.S. Cl. .................... 429/218; 429/220; 429/229
[58] Field of Search ........... 429/194, 218, 220, 229

[56] References Cited

U.S. PATENT DOCUMENTS

| 3,939,008 | 2/1976 | Longo et al. | 429/229 X |
| 4,260,668 | 4/1981 | Lecerf et al. | 429/194 |
| 4,292,382 | 9/1981 | Lecerf et al. | 429/220 X |
| 4,542,083 | 9/1985 | Cava et al. | 429/194 X |

FOREIGN PATENT DOCUMENTS 0421421  4/1991  European Pat. Off. .

Primary Examiner—Stephen Kalafut
Attorney, Agent, or Firm—Bruce L. Adams; Van C. Wilks

[57] ABSTRACT

A nonaqueous electrolyte secondary battery uses lithium or a substance capable of absorbing and releasing lithium as a negative active material of a negative electrode, and uses a layer-like composite oxide of the formula $Li_xM_yL_zO_2$, where M is one or more transistion metal elements selected from Groups IIIB, IVB, VB, VIB, VIIB and VIII of the periodic table, L is one or more elements selected from nonmetal, metalloid and semimetal elements selected from Groups IIIA, IVA and VA of the periodic table, alkaline earth metal elements and metal elements of Zn and Cu as a positive active material constituting a positive electrode. The polarization (internal resistance) at the time of charging and discharging is reduced and an effective charging-discharging capacity is enhanced. Charging and discharging at a large current become easy, and a cycle deterioration is improved.

10 Claims, 19 Drawing Sheets (a) $Li_xCo_yZn_zO_2$ (r1) $LiCoO_2$ (q) ZnO $2\theta$ (deg. CuK$\alpha$)

(a) $Li_xCo_yZn_zO_2$ (r1) $LiCoO_2$ (q) ZnO $2\theta$(deg, CuK$\alpha$)

(b) $Li_xCo_yCu_zO_2$ (r1) $LiCoO_2$ $2\theta$(deg, CuK$\alpha$)

(r2) $LiCoO_2$ (g1) $LiCo_{0.95}Mg_{0.05}O_2$ (g2) $LiCo_{0.80}Mg_{0.20}O_2$ $2\theta$ (deg, CuK$\alpha$)

(r2)LiCoO$_2$ (h1)LiCo$_{0.95}$P$_{0.05}$O$_2$

2θ(deg, CuKα)

MONAQUEOUS ELECTROLYTE SECONDARY BATTERY AND PROCESS FOR PRODUCING POSITIVE ACTIVE MATERIALS

BACKGROUND OF THE INVENTION

Field of the Invention

The present invention relates to a secondary battery comprising a nonaqueous electrolyte, wherein lithium or a material capable of absorbing and releasing lithium is used as a negative active material and there is also used a lithium ion conducting nonaqueous electrolyte, and particularly to an improvement in a positive electrode.

Description of the Related Art

A nonaqueous electrolyte battery using lithium as a negative active material has already been extensively used as a power source for a memory backup, a camera, etc., in the form of a primary battery by virtue of its advantages, such as a high voltage, a high energy desnsity, a small self-discharge and an excellent long-term reliability.

With the remarkable development of portable electronic equipment, communication equipment and other equipment in recent years, however, there appeared a wide variety of equipment wherein the battery as a power source is required to have a large current output, which led to a strong desire for a rechargeable secondary battery having a high energy density from the viewpoint of profitability and a reduction in size and weight. For this reason, research and development have been energetically conducted on the conversion of the above-described battery comprising a nonaqueous electrolyte and having a high energy density into a secondary battery, and some secondary batteries have been put into practical use. However, they are still unsatisfactory in respect of the energy density, charge-discharge cycle life, reliability, etc.

A wide variety of materials, e.g., metal chalcogenides such as $TiS_2$, $MoS_2$, and $NbSe_3$ and metal oxides such as $MnO_3$, $MoO_3$, $V_2O_5$, $Li_xCoO_2$, $Li_xNiO_2$ and $Li_xMn_2O_4$ have been proposed as a positive active material for the secondary battery of the type described above.

In general, in batteries wherein metallic lithium is used as a negative active material, when a metal chalcogenide is used as a positive active material, the operating voltage is generally 3 V or less, or typically 2 V or less. On the other hand, when a metal oxide is used as a positive active material, many of the batteries exhibit a high voltage of 3 V or more and a high energy, so that the number of batteries to be connected in series can be reduced in many applications of the above-described equipment where a power source voltage of 5 V or more is necessary, which renders these batteries advantageous particularly to a reduction in size and weight.

On the other hand, when metallic lithium is used as a negative active material of this type of battery, dendrite or a passivate compound forms on the negative electrode, and deterioration by charging and discharging is great, and the cycle life is short. To solve this problem, an alloy of lithium and other metal, an intercalation compound or an insertion compound having an Li ion in the crystal and a conductive polymer doped with an Li ion are proposed to be used as the negative electrode. But generally when a compound capable of absorbing and releasing an Li ion other than metallic lithium is used as a negative active substance, these compounds have an electrode potential nobler than the electrode potential of the metallic lithium. Thus, the operating voltage of the battery has a defect that it is considerably lower than when metallic lithium is used as the negative active material. For example, when an alloy of Li and Al, Zn, Pb, Sn, etc. is used, the operating voltage decreases by 0.2 to 0.8 V. A carbon-lithium intercalation compound decreases the operating voltage by 0 to 1 V. With an Li ion insertion compound of $MoO_2$ or $WO_2$, the operating voltage is lowered by 0.5 to 1.5 V.

Thus, a substance capable of absorbing and releasing an Li ion is used as a negative active material, and a secondary battery having a high voltage and a high energy density and possessing excellent cycle characteristics may be obtained by using a positive active material with the higher electrode potential versus Li.

Lithium transition metal oxides $Li_xM_yO_2$ having the $\alpha$-$NaCrO_2$ type layer-structure such as $Li_xCoO_2$ or $Li_xNiO_2$ among the positive active materials make an electrode reaction with a lithium negative electrode as shown in formula (2)

$$Li_{x1}M_yO_2 \rightleftharpoons Li_{x1-x2}M_yO_2 + X2Li^+ + X2\,e^- \qquad (2)$$

Wherein x1 is the amount x of Li before charging, x1−x2 is the amount x of Li after charging, $0 < x1 \leqq =1$ and $0 < x1 - x2 \leqq 1$.

The operating voltage is more than 4 V. If the Li ion can deintercalate and intercalate within the range of x=0 to 1, a high theoretical energy density of more than 1100 Whr/kg is expected. Furthermore, there is an advantage that deterioration by charging and discharging is relatively small. Thus, the above substance is promising.

The lithium transition metal oxide $Li_xM_yO_2$ having this layered structure as described in Japanese Unexamined Patent Publication No. 55-136131 is synthesized by mixing a lithium compound($Li_2CO_3$, $LiNO_3$, or $LiOH$) with a transition metal M or its compound (carbonates or nitrates) at a specified ratio and baking the mixture in air or in an oxygen atmosphere at a temperature of 700° to 900° C.

As described above, the charging and discharging reaction of a positive electrode in a battery using $Li_xM_yO_2$, as a positive active material and lithium or a substance capable of of absorbing and releasing lithium as a negative active material proceeds as shown in the above formula (2). That is, an Li ion is deintercalated into the electrolyte from the crystalline structure of the positive active substance $Li_{x1}M_yO_2$ during charging, and is deposited into the negative electrode. Conversely, during discharging, an Li ion formed from the negative electrode passes through the electrolyte and is intercalated in the crystalline structure of the positive active material of the $Li_{x1-x2}M_yO_2$.

Ideally, during this charging and discharging, the region in which an Li ion can reversely deintercalate and intercalate, namely the charging-discharging capacity, is preferably as much as possible and $0 \leqq x2 \leqq 1$. But in a battery using the conventional $Li_xM_yO_2$ the effective charging-discharging capacities are small at a practical charging voltage and current density, and less than 50% of the theoretical. As the current is large, the charging and discharging capacity becomes small. Furthermore, by polarization during discharging, the operating voltage greatly decreases.

Furthermore, when a cycle of charging and discharging is repeated at a specified voltage, the repetition of charging and discharging causes a decrease in charging and discharging capacity, and as the charging and discharging currents are large, the decrease of charging and discharging capacity is great This is due to the fact that by charging, as an Li ion is extracted from $Li_xM_yO_2$ on the positive electrode (deintercalation), the electrode potential of $Li_xM_yO_2$ is remarkably elevated, and the polarization is large because the Li ion conductivity and electron conductivity are low. Thus, the charging voltage greatly increases. At practically stable voltage not higher than the decomposition voltage of the electrolyte to be below-mentioned which may be used in these batteries (about 4 to 4.5 V vs. metallic Li) and the oxidation potential of a battery case or a collector, the charging capacity very much decreases. Especially, in the region in which the amount x of Li in the $Li_xM_yO_2$ is not more than about 0.6, an elevation of potential is extremely large so that within a practical range of a charging voltage and current density, this region cannot substantially be utilized.

SUMMARY OF THE INVENTION

It is an object of the present invention to provide a nonaqueous electrolyte secondary battery comprising a negative electrode having lithium or material capable of absorbing and releasing lithium as an active material, a lithium ion conductive nonaqueous electrolyte, and a positive electrode having an active material composed of a layer-like structure composite oxide $$Li_xM_yL_zO_2 \qquad (1)$$

Wherein M is one or more transition metal elements selected from Groups IIIB, IVB, VB, VIB, VIIB and VIII of the periodic table and L is one or more elements selected from the group consisting of nonmetal, metalloid and semimetal elements selected from Groups IIIA, IVA and VA of the periodic table, alkaline earth metal elements and metal elements selected from Zn and Cu, and x,y and z are $0 < x \leq 1.15$ and $0.85 \leq y+Z \leq 1.3$ and $0 < z$.

Another object of the invention is to provide a process for producing a positive active material for a nonaqueous electrolyte secondary battery, which comprises mixing lithium Li with the transition metal elelment M and the L element, as the sample substances or their compounds, and heating the mixture in air or in an atmosphere containing oxygen to produce the layer-like structure composite oxide of formula (1)

To solve the above problem, the present inventors propose to use a novel layer-like structure composite oxide (to be called a layer-like composite oxide)

$$Li_xM_yL_zO_2 \qquad (1)$$

Wherein M is one or more transition metal elements selected from Groups IIIB, IVB, VB, VIB, VIIB and VIII of the periodic table, L is one or more elements selected from the group consisting of nonmetal, metalloid and semimetal elements selected from Groups IIIA, IVA and VA of the periodic table, alkaline earth metal elements and metal elements selected from Zn and Cu, and x,y and z are $0<x\leq 1.15$, $0.85\leq y+z\leq 1.3$ and $0<z$, as a positive active material of a battery of this type. That is together with lithium Li and the transition metal M, L element is selected from nonmetal, metalloid and semimetal elements such as boron B of Group IIIA of the periodic table, carbon C, silicon Si, and germanium Ge of Group IVA of the periodic table, and nitrogen N, phosphorus P, arsenic As, antimony Sb and bismuth Bi of Group VA of the periodic table; alkaline earth metal elements such as Be, Mg, Ca, Sr, Ba and Ra; and metal elements such as Zn and Cu.

The layer-like composite oxide comprising lithium, the transition metal and L element used as a positive active material of the battery of this invention can be produced in the following manner. The simple substances or compounds such as oxides, hydroxides, salts like carbonates or nitrates, or organic compounds of lithium Li, the transition metal element M and the L element are mixed at specified ratios. The mixture is heated at a temperature of at least 600° C., preferably 700° to 900° C., in air or an atmosphere having oxygen. When the oxide or compound containing oxygen is used as the source of Li, M or L element, the mixture may be heated in an inert atmosphere. The heating time is usually sufficiently 4 to 50 hours. To promote the synthesizing reaction and elevate the uniformity of the product, processes of heating, cooling and pulverizing may effectively be repeated several times.

A stoichiometric value of x=1 is standard for the amount x of Li in formula (1) in the heating reaction process But it may have unstoichiometry about ±15%. By electrochemical intercalation and deintercalation, values of $0<x\leq 1.15$ are also possible Preferred transition metal elements are Co, Ni, Fe, Mn, Cr and V. Especially Co and Ni have given excellent charging and discharging properties. If the amount z of the L element and the amount y of the transition metal M are limited to $0<z$ and $0.85\leq y+z\leq 1.3$, the effects of the decrease in polarization (internal resistance), the increase of charging and discharging capacity and /or the decrease in the cycle deterioration are obtained. On the contrary, the amount of charging and discharging capacity per cycle decreases when the amount z of the L element is too much. The values of z have a preferred range greatly depending upon the type of the L element For example, when the L element is Zn, Cu or P, the charging and discharging capacity is the greatest and therefore, the preferred range is $0<z\leq 0.25$. In the case of B and Si, $0<z\leq 0.5$ is preferred, and in the case of Ti and Mg, $0.05<z\leq 0.5$ is preferred because the charging and discharging capacity is the greatest within these ranges.

On the other hand, the electrolytes may be Li ion conducting nonaqueous electrolytes, such as an Li ion conducting organic electrolyte solutions dissolving Li ion dissociating salts such as $LiClO_4$, $LiPF_6$, $LiBF_4$ or $LiCF_3SO_3$ as a supporting electrolyte, in at least one solvent such as gamma-butyrolactone, propylene carbonate, ethylene carbonate, butylene carbonate, 1,2-dimethoxyethane, tetrahydrofuran, dioxolane and dimethylformamide, polymeric solid electrolytes having the Li salts dissolved in polymers such as polyethylene oxide or polyphosphazen crosslinked product and inorganic solid electrolytes such as $Li_3N$ and LiI.

When the layer-like composite oxide $Li_xM_yL_zO_2$ of this invention is used as a positive active material, the range within which the Li ion can intercalate and deintercalate at a practical charging voltage below the oxidation potential of the battery case and the collector or the decomposition voltage of the electrolyte and at practical charging and discharging current density is broadened over the case of using the conventional $Li_xM_yO_2$; that is, the effective charging and discharging capacity markedly increases. Furthermore, since the polarization (internal resistance) of the battery using the inventive layer-like composite oxide decreases, the elevation of voltage at the time of charging and the decrease of the operating voltage at the time of discharging are very much improved Thus, charging and discharging at a larger current become possible.

Furthermore, cycle deterioration, such as the decrease of the charging and discharging capacity or the increase in the internal resistance of the battery, is very much reduced, and the charging and discharging cycle characteristics are very much improved. The reason why the charging and discharging characteristics are improved is not entirely clear, but the following estimation may be made. The basic crystalline structure of the novel layer-like composite oxide $Li_xM_yL_zO_2$, as shown in the following Examples, have a structure similar to $\alpha$-$NaCrO_2$ resulting from replacing a part of the transition metal element M of $\alpha$-$NaCrO_2$ type layer-like compound $Li_xM_yO_2$ by an L element. The L element may also exist in the interstices between lattices of the crystal or Li sites (substituted for Li). At any rate, the presence of the L element changes the crystal structure and the electron state. Thus, the Li ion conductivity is enhanced and the electrode potential is somewhat decreased. As a result, the Li ion can easily deintercalate and intercalate. Since the rise of the battery voltage at the time of charging and the decrease in the operating voltage at the time of discharging are greatly inhibited, the effective capacities of charging and discharging markedly increase. Furthermore, with the repetition of charging and discharging, it is estimated that there hardly occurs any deterioration in the crystalline destruction by intercalation and deintercalation of the Li ion.

DETAILED DESCRIPTION OF THE PREFERRED EMBODIMENTS

The present invention will be illustrated in detail by several Examples.

EXAMPLE 1

Figure 1:
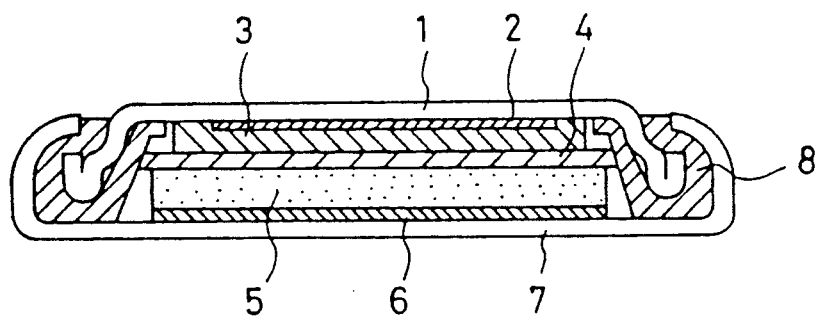
FIG. 1 is an explanatory view of one example of the structure of a battery according to the present invention.

FIG. 1 is a sectional view of the coin-type battery showing one example of the invention. In the drawing, 1 represents a negative electrode can concurrently acting as a negative electrode terminal, which is produced by drawing a stainless steel plate having one outside surface plated with Ni. 2 represents a negative current collector made of stainless steel net which is spot-welded to the negative electrode can. A negative electrode 3 is prepared by punching an aluminum plate of a specified thickness into a disc having a diameter of 15 mm, cementing it to the negative current collector 2, and press-bonding a lithium foil of a specified thickness punched to a diameter of 14 mm onto the aluminum disc. 7 represents a positive electrode can made of stainless steel plated with Ni on one outside surface, and it also acts as a positive electrode terminal. 5 is a positive electrode of the invention, and it is integrally molded with a positive current collector 6 made of a net of stainless steel. 4 is a separator made of a polypropylene porous film, and is impregnated with an electrolyte solution. 8 is a gasket composed of polypropylene, and exists between the negative electrode can 1 and the positive electrode can 7 to maintain electric insulation between the positive electrode and the negative electrode. At the same time, an opening edge of the positive electrode can 7 is bent inwardly and caulked to seal up the battery content. The electrolyte was a mixed solvent composed of propylene carbonate, ethylene carbonate and 1,2-dimethoxyethane in a volume ratio of 1:1:2 in which 1 mole/l of lithium perchlorate $LiClO_4$ was dissolved. The size of the battery was 20 mm in outside diameter and 1.6 mm in thickness.

The positive electrode 5 was produced in the following manner. Lithium hydroxide $LiOH.H_2O$, cobalt carbonate $CoCO_3$ and zinc oxide ZnO in a mole ratio of Li:Co:Zn=1:0.75:0.25 were fully mixed by a mortar, and the mixture was heated in air at 850° C. for 12 hours. The mixture was cooled and pulverized to a particle size of smaller than 53 μm. This heating and pulverization were repeated two times to prepare a positive active material a in accordance with the invention. For reference, Zn-free conventional layer-like oxide $LiCoO_2$ was prepared in the following manner. Lithium hydroxide $LiOH.H_2O$, and cobalt carbonate $CoCO_3$ were mixed in a Li:Co ratio of 1:1. The mixture was heated at 850° C. for 12 hours in air, and after cooling, the mixture was pulverized to a particle size of smaller than 53 μm. This heating and pulverization were repeated two times to obtain a comparative material r1.

These products were used as a positive active material and mixed with graphite as an electrically conducting agent and a fluororesin as a binder in a weight ratio of 60:35:5 to form a positive mix. Then, the positive mix was press-molded together with a positive current collector 6 of stainless steel net at a pressure of 2 ton/cm² to form a pellet having a diameter of 15 mm and a thickness of 0.5 mm. The pellet was dried under reduced pressure at 100° C. for 10 hours to make it a positive electrode.

The battery so prepared was allowed to stand for one week at room temperature and aged, and the following charging and discharging test was conducted. The lithium-aluminum laminated electrode as a negative electrode was sufficiently alloyed by contacting a nonaqueous electrolyte solution in the battery, and the lithium foil substantially became an Li-Al alloy. Thus, the voltage of the battery was about 0.4 V lower than when using metallic lithium alone as a negative electrode, and was stabilized.

The so prepared batteries will be referred to as batteries A and R1 corresponding to positive active materials a and r1.

Figure 2:
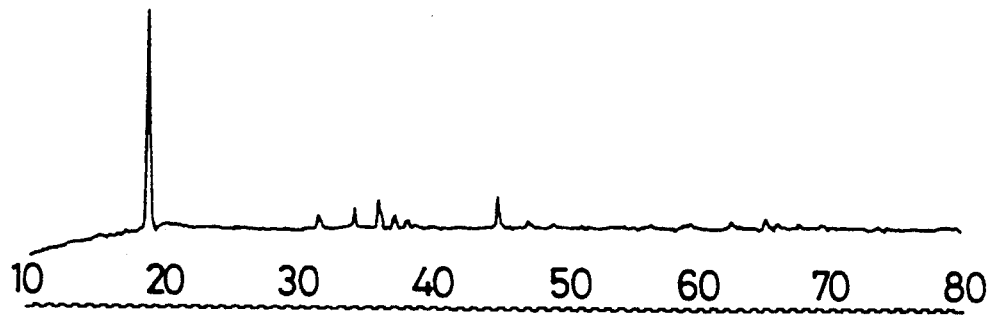
FIG. 2 is an explanatory view showing a comparison of the powder X-ray diffraction patterns of various positive active materials.
Figure 2:
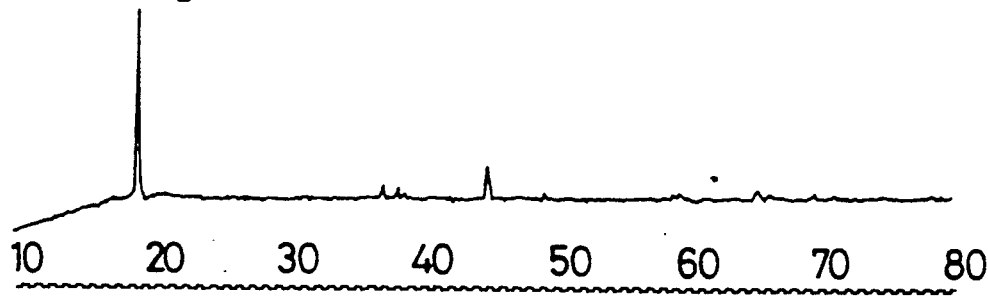
Figure 2:
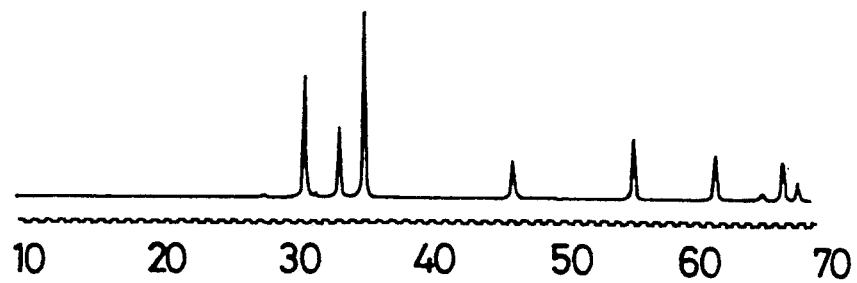

FIG. 2 shows X-ray diffraction patterns of using $CuK_\alpha$ rays of the positive active materials a and r1 prepared as above and the starting zinc oxide ZnO (referred to as q) used in the synthesis of the active material a. As is apparent from the above, the diffraction pattern of the compared active material r1 agrees with $LiCoO_2$ having an $\alpha$-$NaCrO_2$ type layer-like structure shown in the ASTM card No.16-427. On the other hand, the active material a has peaks from $\alpha$-$NaCrO_2$ type layer-like compound crystal and minute peaks assumed to be from the starting ZnO (for example, $2\theta \approx 31.6$, 34.3, 36.2 and 47.4°). However, these peak strengths from ZnO in comparison with the measurement sensitivity of 100% diffraction reference (q) of the starting material ZnO is very much smaller than the peak strength expected from the amount of ZnO added at the time of synthesizing the active material a. Hence, a considerable amount of Zn atoms added constitutes a composite oxide $Li_xCo_yZn_zO_2$ having a layer-like structure similar to $\alpha$-$NaCrO_2$ type. Thus, the active material a is a mixture of a composite oxide $Li_xCo_yZn_zO_2$ having a layer-like structure similar to $\alpha$-$NaCrO_2$ type and a small amount of the unreacted material of the starting ZnO. The amount Z of Zn in the $Li_xCo_yZn_zO_2$ is smaller than 0.25 mole added at the time of synthesizing but may be estimated to be considerably large. The diffraction peak from $Li_xCo_yZn_zO_2$ of the active material a is slightly shifted to a lower angle side as compared with the peak from $LiCoO_2$ of r1, and the relative strength of each peak shows some differences and otherwise there is hardly any variation. Thus, most of the Zn atoms in $Li_xCo_yZn_zO_2$ occupy the sites which are substituted for Co atoms in $LiCoO_2$, and there are a few which enter in spaces between crystal lattices. Furthermore, the interlayer spaces of $Li_xCo_yZn_zO_2$ are estimated to be slightly broader than $LiCoO_2$. As known, the cell reaction potential between Li and ZnO is less than 2 V. Positive active materials which react at 4 to 2 V in the charging and discharging test mentioned below are all layer-like composite oxide $Li_xCo_yZn_zO_2$ and the remaining ZnO does not contribute to the reaction.

Figure 3:
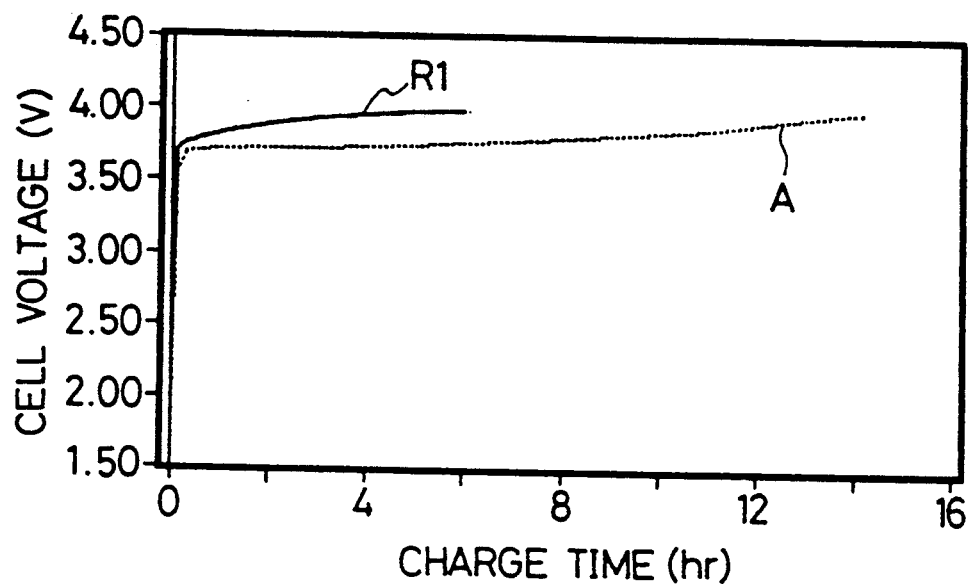
FIG. 3 is an explanatory view showing a comparison of the charging characteristics in the first cycle of the battery of this invention and the prior art battery.
Figure 4:
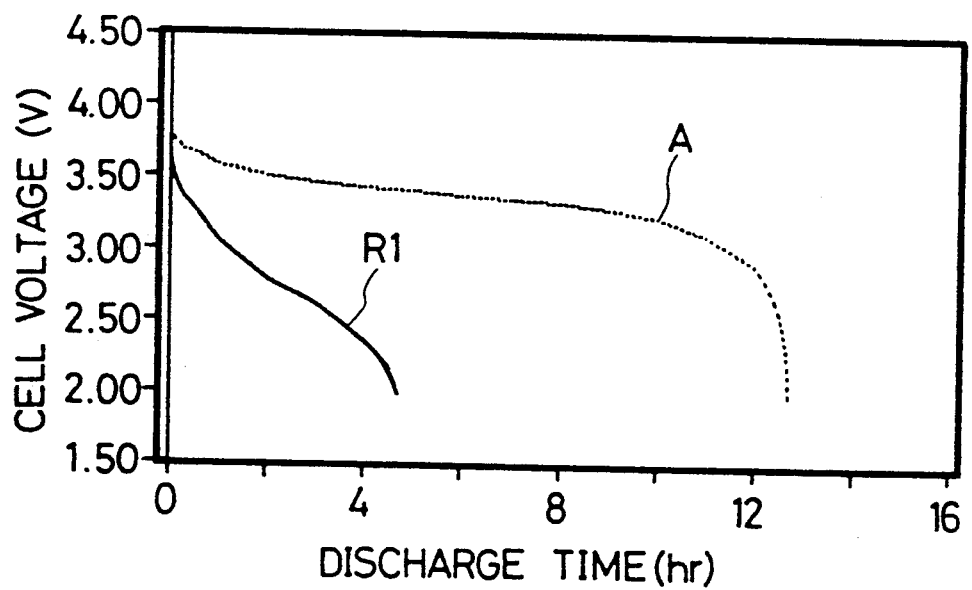
FIG. 4 is an explanatory view showing a comparison of the discharging characteristics of the battery of this invention and the prior art battery in the first cycle.
Figure 5:
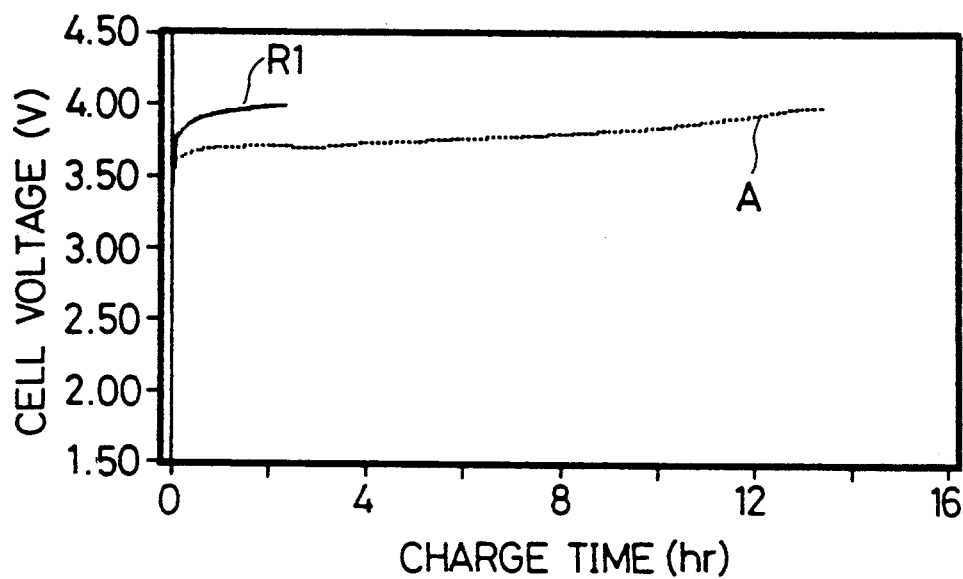
FIG. 5 is an explanatory view showing a comparison of the charging characteristics of the battery of this invention and the prior art battery in the second cycle.
Figure 6:
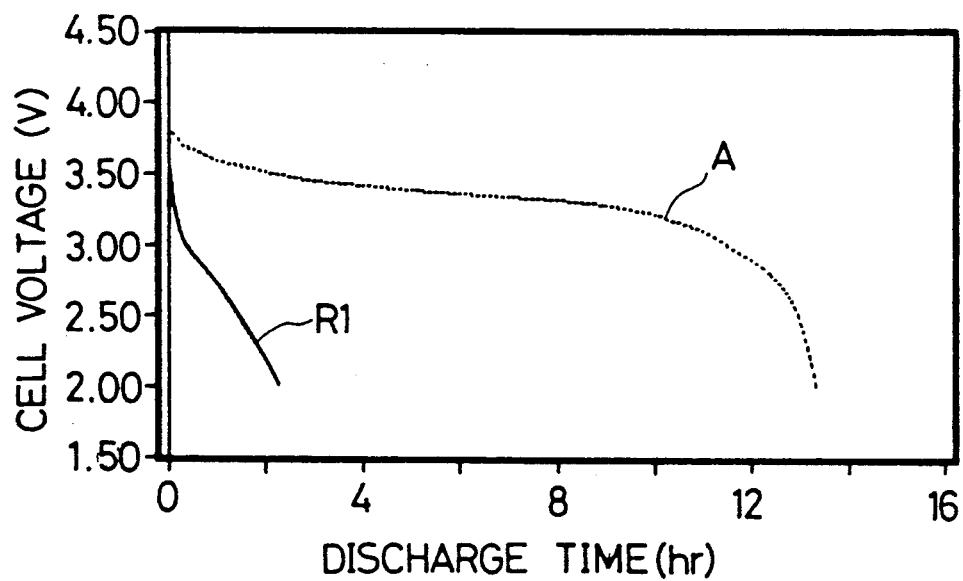
FIG. 6 is an explanatory view showing a comparison of the discharging characteristics of the battery of this invention and the prior art battery in the second cycle.

These batteries A and R1 were charged and discharged in cycles at a fixed current of 1 mA at a charging terminating voltage of 4.0 V and a discharging terminating voltage of 2.0 V. The charging characteristics in the first cycle are shown in FIG. 3, and the discharging characteristics in the first cycle are shown in FIG. 4. The charging characteristics in the second cycle are shown in FIG. 5, and the discharging characteristics in the second cycle are shown in FIG. 6. The charging and discharging cycle started at charging. As is apparent from FIG. 3 to FIG. 6, the battery A of this invention was much larger in charging and discharging capacities than the conventional battery R1, and the reversible region of charging and discharging is very much broadened. Furthermore, in all charging and discharging regions, the charging voltage is lower by 0.2 V to 0.3 V, and conversely the operating voltage of discharging is much higher. The polarization (internal resistance) of the battery is greatly improved, and charging and discharging at a large current is easy. This is ascribed to the reason that in the positive active material of the battery A of the invention, that is, the layer-like composite oxide $Li_xCo_yZn_zO_2$, a part of the Co atoms of $LiCoO_2$ are substituted by Zn atoms, and as a result, the interlayer spaces of the crystals becomes broadened and changes occur in crystal structure and electron state. Thus, the conductivity of the Li ion is elevated, and at the same time, the electrode potential is decreased by about 0.1 V

EXAMPLE 2

Copper Cu was used as an L element constituting a positive active material. Except for the positive active material, a battery was prepared in the same way as in Example 1.

A positive active material was prepared in the following manner. Lithium hydroxide $LiOH \cdot H_2O$, cobalt carbonate $CoCO_3$ and copper oxide CuO were fully mixed in a mortar in a Li:Co:Cu mole ratio of 1:0.75:0.25. The mixture was heated at a temperature of 850° C. in air for 12 hours, and after cooling, pulverized to a particle size of smaller than 53 μm. The heating and pulverization were repeated two times to prepare a positive active material b. For comparison, a conventional Cu-free layer-like oxide $LiCoO_2$ was used as r1.

The batteries so prepared are abbreviated as batteries B and R1 corresponding to the positive active materials b and r1.

Figure 7:
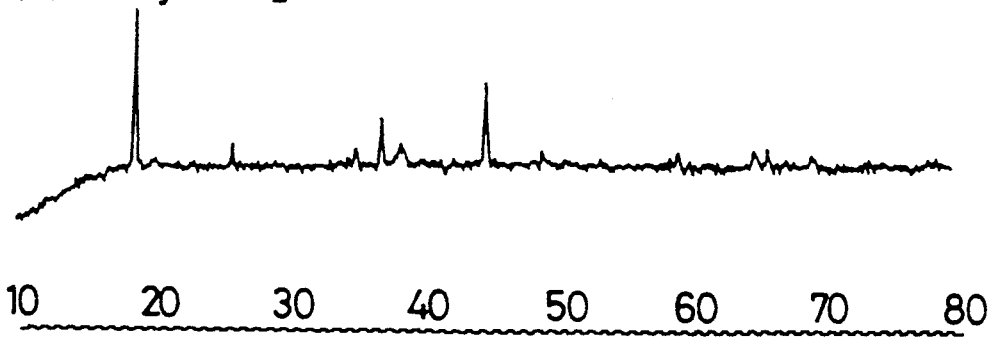
FIG. 7 is an explanatory view showing a comparison of the powder X-ray diffraction patterns of the various positive active substance.
Figure 7:
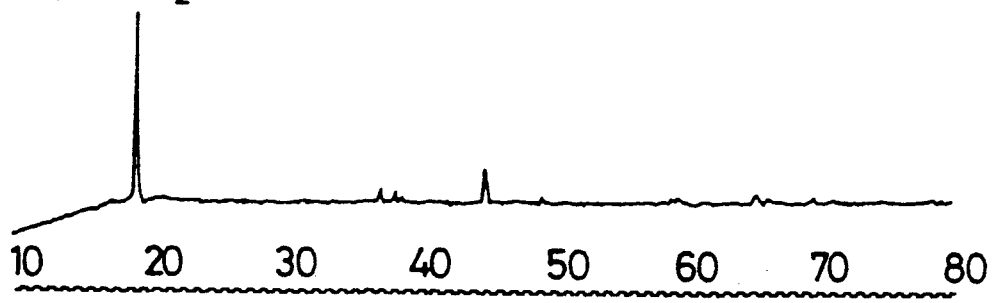

FIG. 7 shows the X-ray diffraction patterns using Cu$k^\alpha$ rays of the positive active materials b and r1 produced as shown above. As can be shown in the drawing, the diffraction pattern of the comparative active material r1 agrees with $LiCoO_2$ having an α-$NaCrO_2$ type layer-like structure shown in ASTM card No.16-427. On the other hand, the active material b in accordance with this invention has the peaks from α-$NaCrO_2$ type layer-like compound crystal and minute peaks assumed to be corresponding to the starting CuO or other oxides comprising Co, Li and Cu (for example, $2\theta \approx 26.0$, 35.5 and 38.8°). However, these peaks are much smaller than the peak intensities expected from the amount of CuO added at the time of synthesizing the active material b. Accordingly, a considerable amount of the added Cu atoms constitutes a composite oxide $Li_xCo_yCu_zO_2$ having a layer-like structure similar to α-$NaCrO_2$ type. In other words, the active material b in accordance with this invention is a mixture of a composite oxide $Li_xCo_yCu_zO_2$ having a layer-like structure similar to the α-$NaCrO_2$-like and a small amount of the starting CuO or other Li, Co and Cu oxides. The amount Z of Cu in the $Li_xCo_yCu_zO_2$ is smaller than 0.25 mole, but assumed to be considerably large. The diffraction peaks from the active material b, namely $Li_xCo_yCu_zO_2$, as compared with the peaks from $LiCoO_2$, r1, are shifted slightly to a lower angle side, and except that the relative strength of each peak is slightly different, no other changes exist. So it is presumed most of the Cu atoms in the $Li_xCo_yCu_zO_2$ enter into positions resulting from substituting Co atoms in $LiCoO_2$ by Cu atoms and a very few enter the spaces between crystal lattices. Moreover, the interlayer space of $Li_xCo_yCu_zO_2$ is assumed to be slightly widened as compared with the interlayer space of $LiCoO_2$. Furthermore, since a cell reaction voltage between Li-Al alloy negative electrode and CuO is known to be below 2 V, the positive active material which reacts at 4 to 2 V in the below-mentioned charging and discharging test is substantially only a layer-like composite oxide $Li_xCo_yCu_zO_2$, and the coexisting CuO, etc. do not participate in the reaction.

Figure 8:
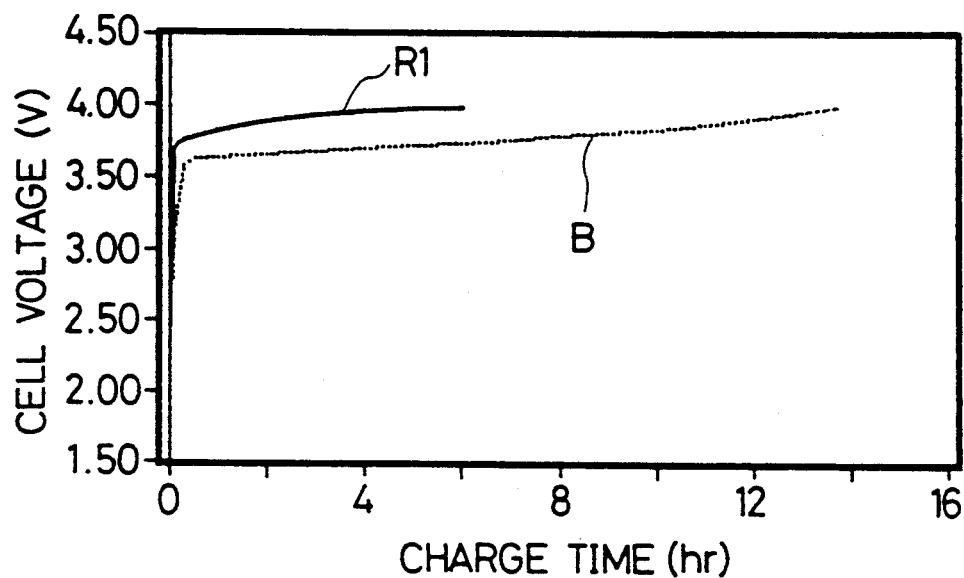
FIG. 8 is an explanatory view showing a comparison of the charging characteristics of the battery of the invention and the prior art battery in the first cycle.
Figure 9:
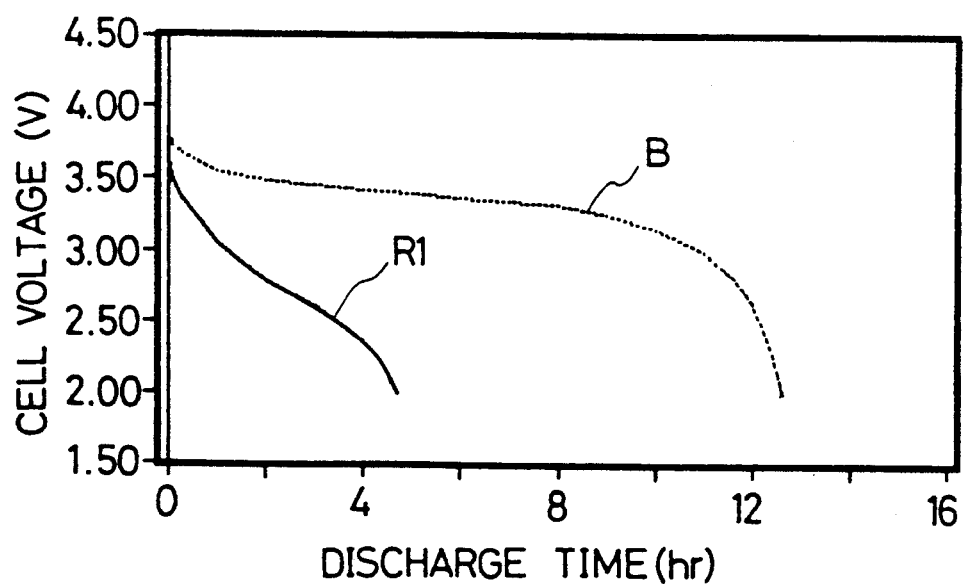
FIG. 9 is an explanatory view showing a comparison of the discharging characteristics of the battery of this invention and the prior art battery in the first cycle.
Figure 10:
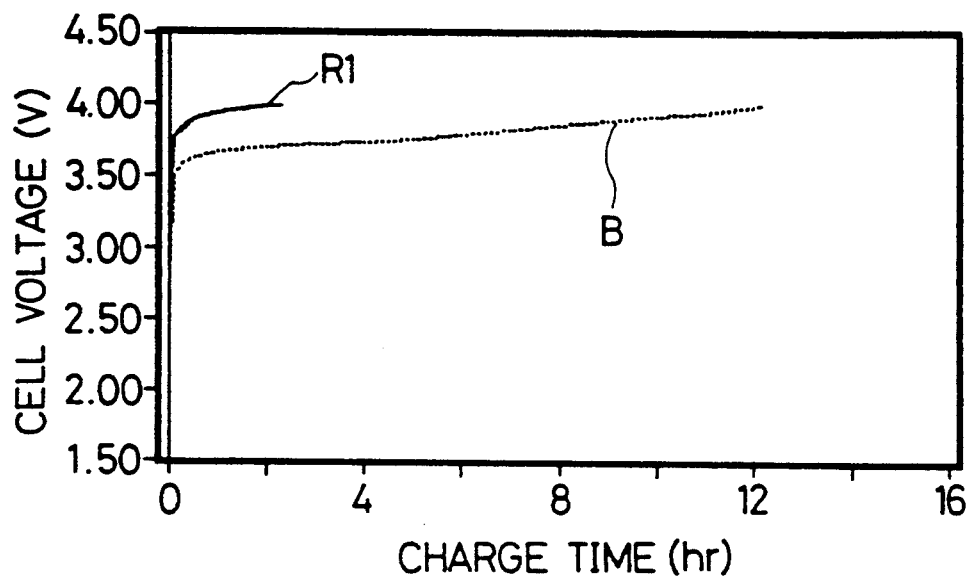
FIG. 10 is an explanatory view showing a comparison of the charging characteristics of the battery of this invention and the prior art battery in the second cycle.
Figure 11:
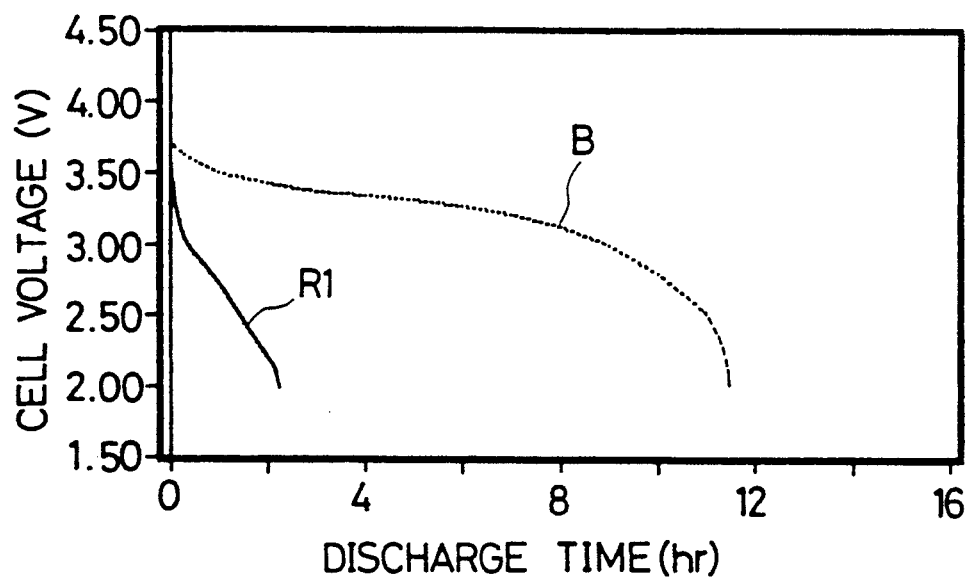
FIG. 11 is an explanatory view showing a comparison of the discharging characteristics of the battery of this invention and the prior art battery in the second cycle.

These batteries B and R1 were subjected to charging and discharging in cycles at a fixed current of 1 mA under a charging terminal voltage of 4.0 V and a discharging terminal voltage of 2.0 V. The charging characteristics in the first cycle are shown in FIG. 8, and the discharging characteristics in the first cycle are shown in FIG. 9. The charging characteristics in the second cycle are shown in FIG. 10, and the discharging characteristics in the second cycle are shown in FIG. 11. The charging and discharging cycle started at charging. It is seen that the battery B has much larger charging and discharging capacities than the conventional battery R1, and the reversible range of charging and discharging is very much widened. In all charging and discharging regions, the charging voltage is about 0.3 V lower, and conversely, the operating voltage of discharging becomes very much elevated. Thus, the polarization (internal resistance) of the battery is greatly decreased, and charging and discharging at a large current become very easy. This is because in the layer-like composite oxide $Li_xCo_yCu_zO_2$ which is the positive active material of the battery B, a part of the Co atoms of the $LiCoO_2$ are replaced by Cu atoms so that the interlayer space of the crystal is enlarged and changes occur in crystal structure and electron state. Hence, it may be thought that the conductivity of an Li ion is elevated, and simultaneously the electrode potential decreases about 0.1 V.

EXAMPLE 3

As an L element constituting the positive active material, titanium Ti was used. Otherwise, a battery was prepared in the same way as in Example 1.

The positive active material of this example was prepared as follows Lithium hydroxide $LiOH \cdot H_2O$, cobalt carbonate $CoCO_3$ and titanium oxide $TiO_2$ were fully mixed in a mortar at a mole ratio of Li:Co:Ti=1:0.75:0.25. The mixture was heated in air at a temperature of 850° C. for 12 hours, and after cooling, pulverized to a particle size of smaller than 53 μm. This heating and pulverization were repeated two times to obtain a layer-like composite oxide having the composition $LiCo_{0.75}Ti_{0.25}O_2$. It was used as a positive active material c. For comparison, r1 of Example 1 was used as a Ti-free conventional layer-like oxide $LiCoO_2$.

Figure 12:
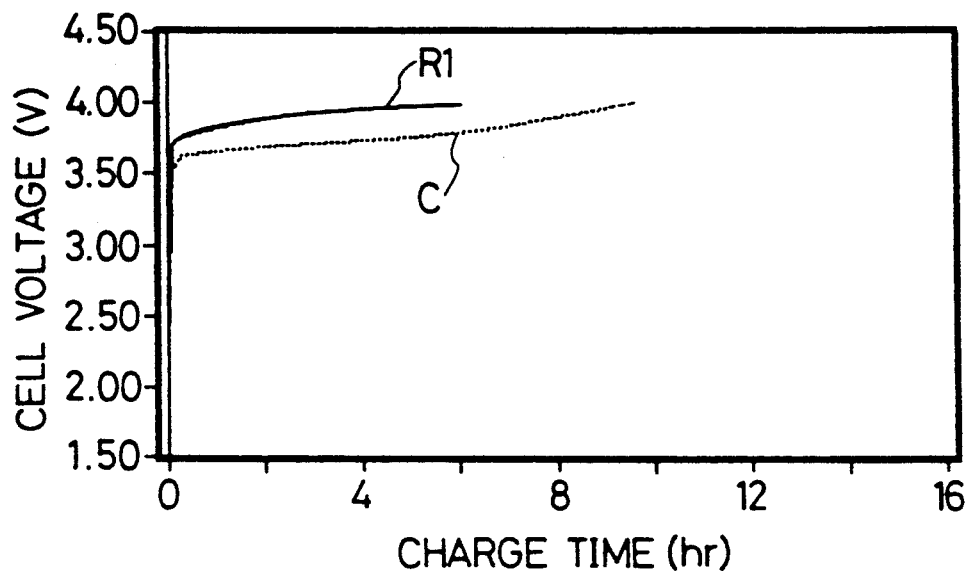
FIG. 12 is an explanatory view showing a comparison of the charging characteristics of the battery of this invention and the prior art battery in the first cycle.
Figure 13:
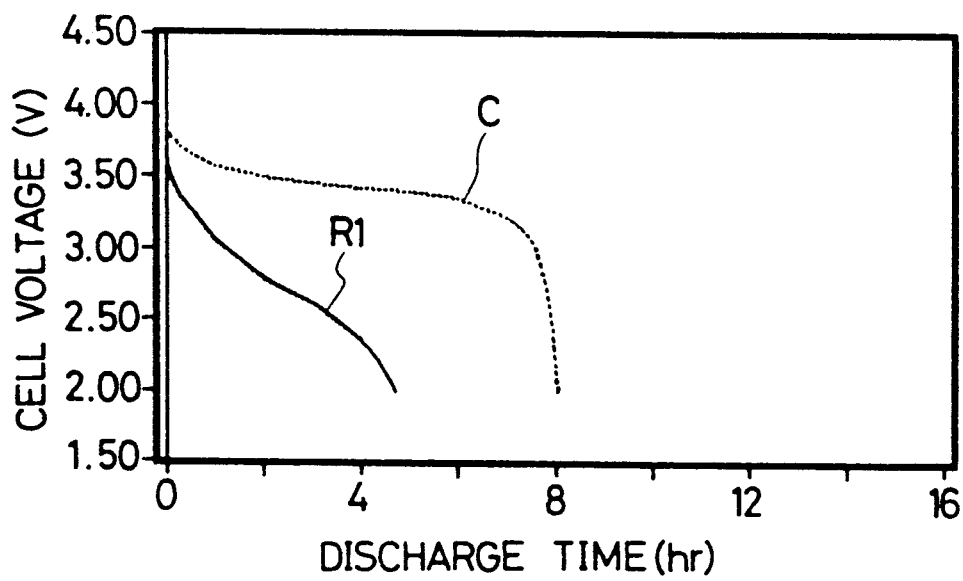
FIG. 13 is an explanatory view showing a comparison of the discharging characteristics of the battery of this invention and the prior art battery in the first cycle.
Figure 14:
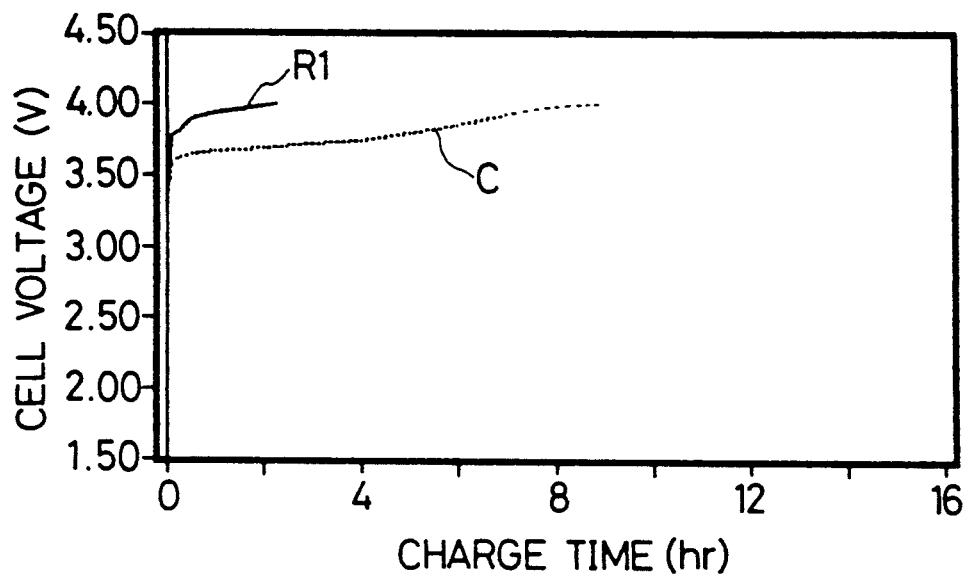
FIG. 14 is an explanatory view showing a comparison of the charging characteristics of the battery of this invention and the prior art battery in the second cycle.
Figure 15:
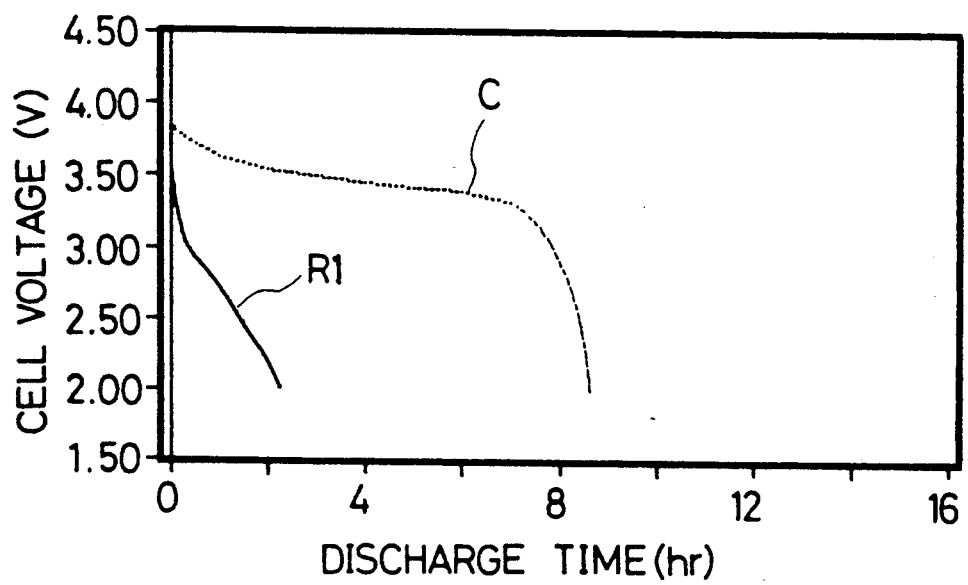
FIG. 15 is an explanatory view showing a comparison of the discharging characteristics of the battery of this invention and the prior art battery in the second cycle.

The batteries so prepared are abbreviated as batteries C and R1 corresponding to the positive active materials c and r1. These batteries C and R1 were subjected to a charging and discharging cycle at a fixed current of 1 mA under a charging termination voltage of 4.0 V and a discharging termination voltage of 2.0 V. The charging characteristics in the first cycle are shown in FIG. 12, and the discharging characteristics in the first cycle are shown in FIG. 13. The charging characteristics in the second cycle are shown in FIG. 14, and the discharging characteristics in the second cycle are shown in FIG. 15 The charging and discharging cycle started from charging. It is apparent from FIGS. 12 to 15 that the battery C of this invention is much larger in charging and discharging capacities than the conventional battery R1, and the reversible region of charging and discharging is greatly increased. Furthermore, in all charging and discharging regions, the charging voltage was about 0.3 V lower, and conversely, the operating voltage of discharging is very much elevated. Thus, the polarization (internal resistance) of the battery is very much reduced, and charging and discharging at a large current are easy. This is because in the layer-like composite oxide $Li_xCo_yTi_zO_2$ which is the positive active material of the battery C, a part of Co atoms of the $LiCoO_2$ are replaced by Ti atoms, and the interlayer spaces of the crystal are broadened and changes in crystalline structure and electron state occur. Hence, the conductivity of an Li ion increases and intercalation and deintercalation of an Li ion is assumed to become easy.

EXAMPLE 4

In this Example, boron B as a metalloid element of Group IIIA of the periodic table was used as the L element constituting a positive active material. Except for the positive electrode, batteries were produced basically as in Example 1.

A positive electrode 5 was prepared in the following manner. Lithium hydroxide $LiOH.H_2O$, cobalt carbonate $CoCO_3$ and boron oxide $B_2O_3$ were fully mixed in a mortar in a specified mole ratio of Li:Co:B. The mixture was heated in air at a temperature of 850° C. for 12 hours, and after cooling, the mixture was ground to a particle size of smaller than 53 μm. This heating and pulverization were repeated two times to prepare the positive active material In this Example, two mole ratios were used, namely 1:0.95:0.05 (d1) ($LiCo_{0.95}B_{0.05}O_2$) and 1:0.8:0.2 ($LiCo_{0.8}B_{0.2}O_2$) (d2). For comparison, boron-free conventional layer-like oxide $LiCoO_2$ was prepared in the following manner. Lithium hydroxide $LiOH.H_2O$ and cobalt carbonate $CoCO_3$ were mixed at a Li:Co mole ratio of 1:1. This mixture was heated in air at a temperature of 850° C. for 12 hours, and after cooling, pulverized to a particle size of smaller than 53 μm. This heating and pulverization were repeated two times to obtain a comparative substance (r2).

These products were used as a positive active material and mixed with graphite as a conductive agent and a fluororesin and so on as a binder at a weight ratio of 60:35:5 to form a positive mix. Next, this positive mix was press-molded at a pressure of 2 ton/cm² into a pellet having a diameter of 15 mm and a thickness of 0.5 mm together with a positive current collector 6 of a net composed of stainless steel and then the pellet was dried under reduced pressure at 100° C. for 10 hours to form a positive active material The battery so prepared was allowed to be aged at room temperature for 1 week, and subjected to the following charging and discharging test. By this aging, the lithium-aluminum laminated electrode as a negative electrode contacted the nonaqueous electrolyte whereby the alloying proceeded very well. The lithium foil substantially all became an Li-Al alloy. Thus, the voltage of the battery was about 0.4 V lower than the case of using metallic lithium alone as a negative electrode and became stabilized.

The batteries so produced are referred to as batteries D1,D2 and R2 corresponding to the positive active materials d1, d2 and r2 used.

Figure 16:
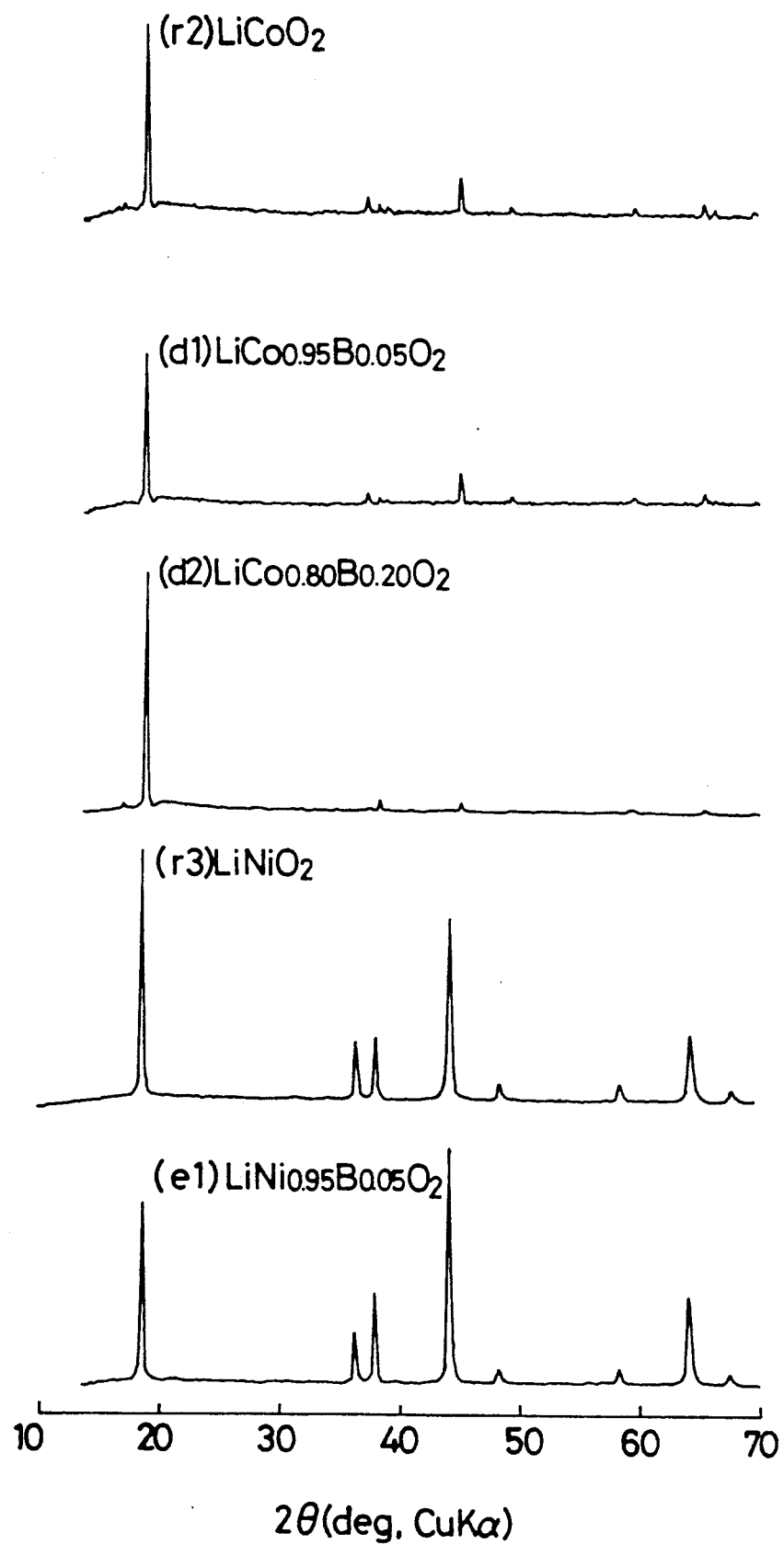
FIG. 16 is an explanatory view showing a comparison of the powdery X-ray diffraction patterns of the various positive active materials.

FIG. 16 shows X-ray diffraction patterns of the positive active materials d1 and d2 and the comparative material r2 using $Cuk^{\alpha}$ rays. As is apparent from the drawing, the diffraction pattern of the comparative material r2 agrees with the $LiCoO_2$ having $\alpha$-$NaCrO_2$ type layer-like structure of ASTM card No. 16-427. On the other hand, the diffraction patterns of the active materials d1 and d2 of this invention are very similar to the diffraction pattern of the comparative material $LiCoO_2$. There is no clear difference in the positions of the individual peaks, and no unknown new peaks are seen. But differences are seen in the relative strengths of the diffraction peaks. That is, the diffraction intensities from the (003) and (006) faces perpendicular to the c-axis of the hexagonal system such as $2\theta \approx 18.9°$ and 38.3° are larger than the diffraction strengths from other faces, and this tendency is stronger as the content of boron B is larger. The active materials d1 and d2 of this invention have such a structure that a part of the Co atoms in the oxide $LiCoO_2$ having $\alpha$-$NaCrO_2$-type layer-like structure are replaced by B atoms, and it is estimated that most of the boron atoms B occupy the sites substituted for Co atoms and few are entered at the space between the crystal lattices and Li sites. That is the active materials d1 and d2 of this invention have a layer-like structure like an $\alpha$-$NaCrO_2$-type, and are judged to be a lithium-boron transition metal composite oxides having the compositions $LiCo_{0.95}B_{0.05}O_2$ and $LiCo_{0.8}B_{0.2}O_2$.

Figure 17:
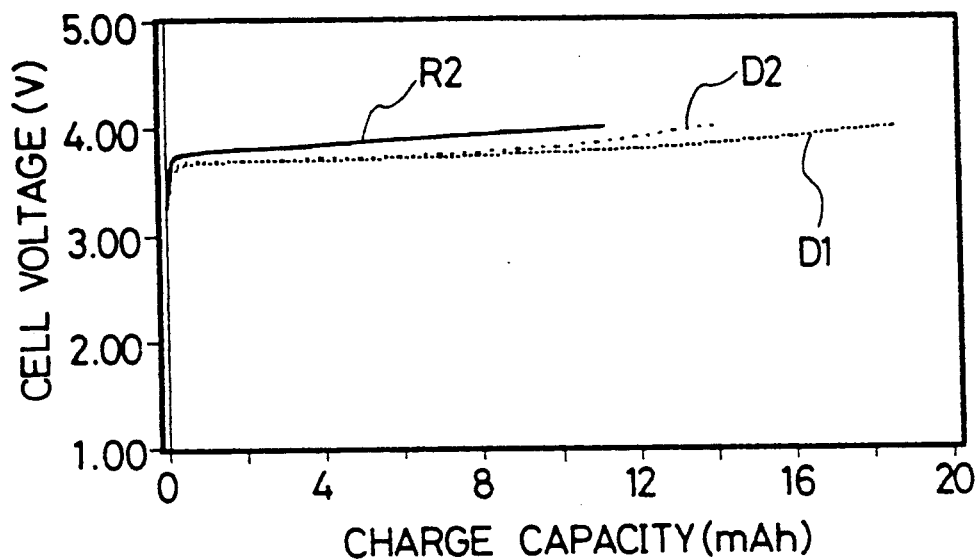
FIG. 17 is an explanatory view showing a comparison of the charging characteristics of the batteries of this invention and the prior art battery in the second cycle.
Figure 18:
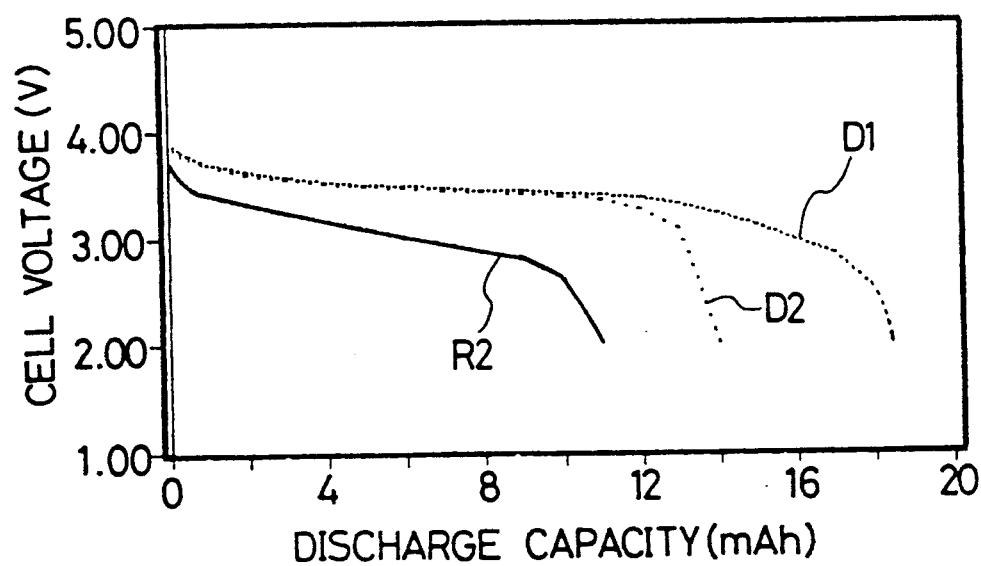
FIG. 18 is an explanatory view showing a comparison of the discharging characteristics of the batteries of this invention and the prior art battery in the second cycle.
Figure 19:
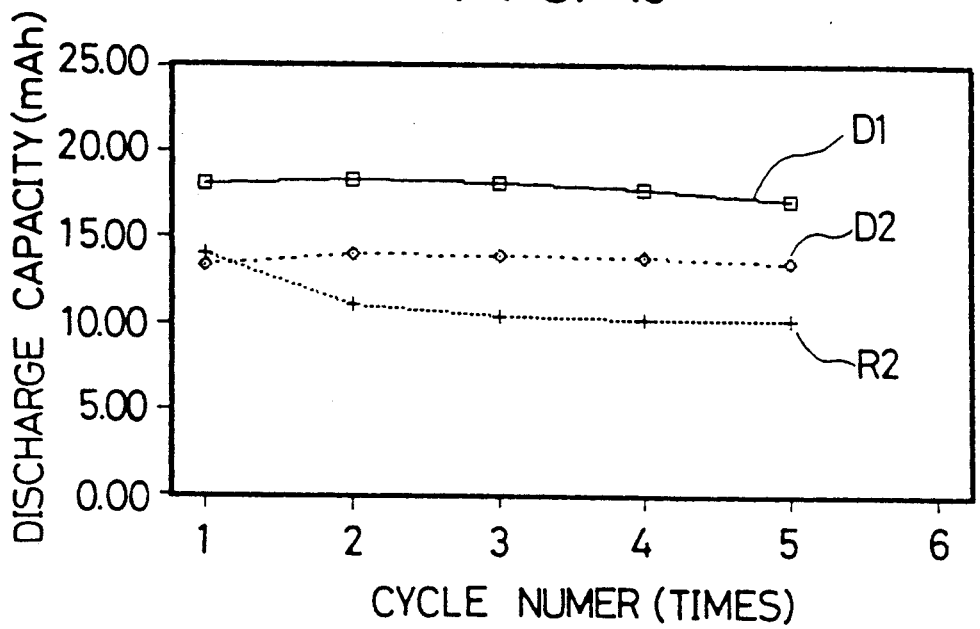
FIG. 19 is an explanatory view showing a comparison of the cycle characteristics of the batteries of this invention and the prior art battery.

These batteries D1, D2 and R2 were subjected to a charging and discharging cycle at a fixed current of 1 mA under a charging termination voltage of 4.0 V and a discharging termination voltage of 2.0 V. The charging characteristics in the second cycle are shown in FIG. 17, and the discharging characteristics in the second cycle are shown in FIG. 18. The cycle characteristics are shown in FIG. 19. The charging and discharging cycle started with the charging. As can be seen from FIGS. 17 to 19, the batteries D1 and D2 as compared with the comparative battery R2 have much larger charging and discharging capacities, and the reversible region of charging and discharging is very much enhanced. The decrease of discharging capacities (cycle deterioration) by the repetition of charging and discharging is extremely small. Over the entire charging and discharging region, the charging voltage was lower by 0.2 to 0.3 V and the operating voltage of discharging increased to a very high level. Thus, polarization (internal resistance) of the batteries was very much improved, and charging-discharging at a large current becomes easy. This is probably because in the layer-like composite oxide $Li_xCo_yB_zO_2$ which constitutes the positive active materials of the batteries D1 and D2 of this invention, a part of the Co atoms in $LiCoO_2$ are replaced by B atoms and thereby changes occur in crystal structure and electron state so that the conductivity of an Li ion is enhanced and the intercalation and deintercalation of the Li ion become easy.

The charging and discharging capacity decreases conversely when the amount z of boron is too large, and becomes a maximum at $0 < Z \leq 0.5$. This range is therefore especially preferred.

EXAMPLE 5

In this Example, nickel Ni was used as the transition metal element M constituting a positive active material and boron B was used as a metalloid element of Group IIIA of the periodic table which is the L element. Except for the positive active material, batteries were prepared in the same manner as in Example 4.

The positive active materials of this Example were prepared in the following manner. Lithium hydroxide LiOH.H$_2$O, nickel oxide NiO and boron oxide B$_2$O$_3$ were weighed in a specified mole ratio of Li:Ni:B, and fully mixed in a mortar. The mixture was heated in air at a temperature of 850° C. for 12 hours, and after cooling, pulverized to a particle size of smaller than 53 μm. This heating and pulverization were repeated two times to produce the positive active materials. In this Example, the Li:Ni:B mole ratio was varied in 1:0.95:0.05(e1)-(LiNi$_{0.95}$B$_{0.05}$O$_2$) and 1:0.8:0.2 (e2) (LiNi$_{0.8}$B$_{0.2}$O$_2$). For comparison, a boron-free conventional layer-like oxide LiNiO$_2$ was prepared in the following manner. Lithium hydroxide LiOH.H$_2$O and nickel oxide NiO were mixed in a mole ratio of Li:Ni=1:1. The mixture was heated in air at a temperature of 850° C. for 12 hours, and after cooling, pulverized to a particle size of smaller than 53 μm. This heating and pulverization were repeated two times to form a comparative substance(r3).

Except that these products were used as the positive active materials, batteries were produced in the same way as in Example 4. The batteries so prepared are abbreviated as E1, E2 and R3 corresponding to the positive active materials e1,e2 and r3.

Figure 20:
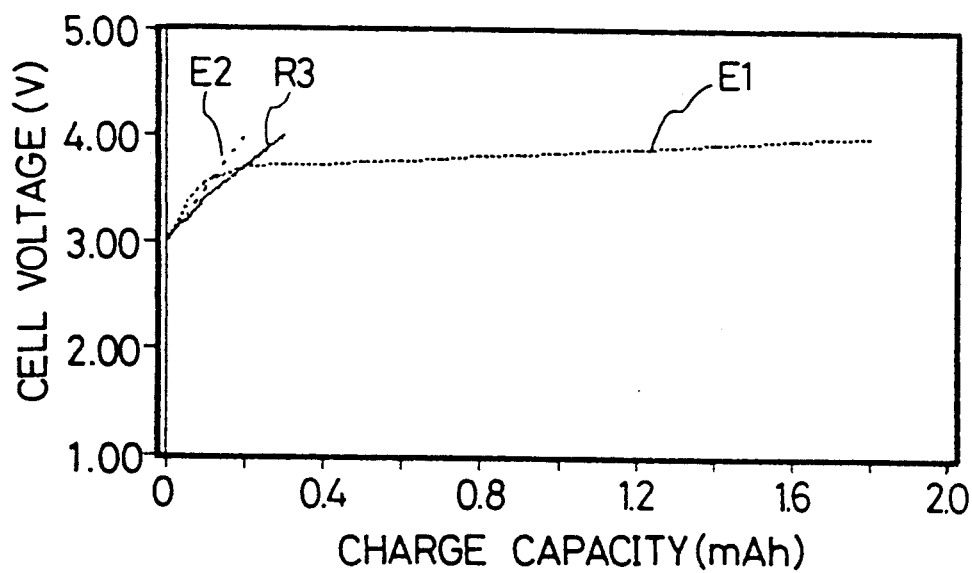
FIG. 20 is an explanatory view showing a comparison of the charging characteristics of the batteries of this invention and the prior art battery in the second cycle.
Figure 21:
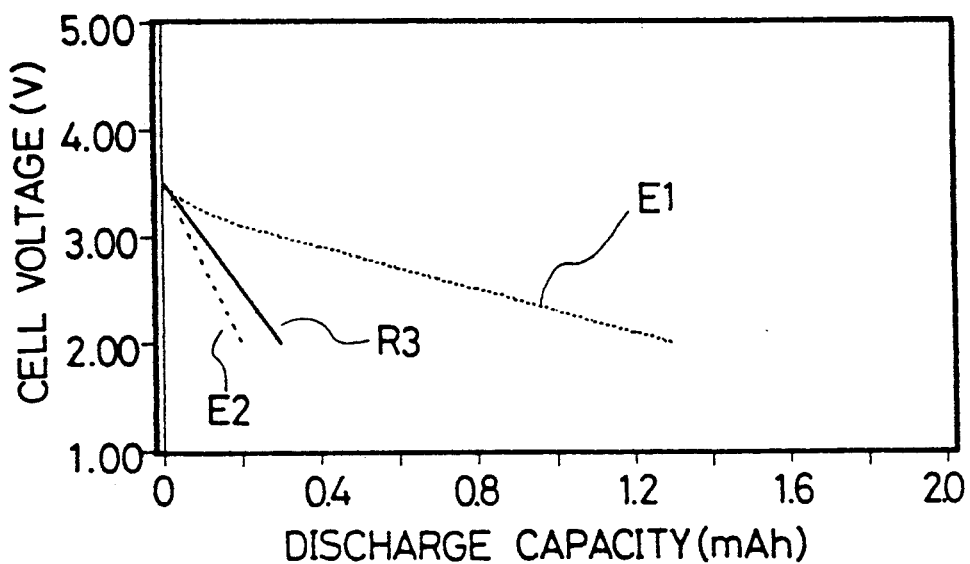
FIG. 21 is an explanatory view showing a comparison of the discharging characteristics of the batteries of this invention and the prior art battery in the second cycle.

These batteries were subjected to a charging and discharging cycle test at a fixed current of 1 mA as in Example 4. The charging characteristics in the second cycle are shown in FIG. 20, and the discharging characteristics in the second cycle are shown in FIG. 21. FIG. 16 shows X-ray diffraction patterns using Cuk$^\alpha$ rays of the positive active materials e1 and r3 prepared as above.

As is shown in FIG. 16, the diffraction pattern of the comparative material r3 agreed with LiNiO$_2$ having an α-NaCrO$_2$ type layer-like structure of ASTM card No. 9-63. On the other hand, the diffraction pattern of the active material e1 of the invention is very similar to the diffraction pattern of the comparative material r3. No clear difference is seen in the positions of the diffraction peaks, and no unknown new diffraction peak is seen. But there is a difference in the relative strength of the diffraction peaks. The active material e1 of this invention has a structure wherein a part of the Ni atoms in the oxide LiNiO$_2$ having α-NaCrO$_2$ type layer-like structure are replaced by boron atoms B. It is estimated that most of the boron atoms B exist in the positions substituted for Ni atoms, and few are placed in the interstices between crystal lattices or the Li sites. That is to say, it is judged that the active materials e1 and e2 of this invention have a layer-like structure similar to the α-NaCrO$_2$ type, and are assumed to be lithium-boron transition metal composite oxides having the compositions LiNi$_{0.95}$B$_{0.05}$O$_2$ and LiNi$_{0.05}$B$_{0.2}$O$_2$.

As is clear from FIGS. 20 and 21, in this Example, the battery E1 has a much larger charging-discharging capacity than the comparative battery R3, and the reversible range of charging-discharging is very much widened. On the otherhand, the battery E2 having a boron content z of 0.2 showed no improvement in a charging-discharging capacity, but is slightly lowered. When the transition metal element M is nickel Ni, the amount z of boron B is preferably $0<z<0.2$

EXAMPLE 6

In this Example, a metalloid silicon Si as Group IVA was used as the L element constituting the positive active material. Except for the positive active material, batteries were prepared as in Example 4.

The positive active materials were prepared in the following manner. Lithium hydroxide LiOH.H$_2$O, cobalt carbonate CoCO$_3$ and silicon dioxide SiO$_2$ were weighed in a specified mole ratio of Li:Co:Si and mixed fully in a mortar. The mixture was heated in air at a temperature of 850° C. for 12 hours, and after cooling, pulverized to a particle size of smaller than 53 μm. This heating and pulverization were repeated two times to synthesize the positive active materials of this invention. In the Example, two products, namely Li:Co:Si of 1:0.95:0.05(f1) (LiCo$_{0.95}$Si$_{0.05}$O$_2$) and of 1:0.8:0.2(f2) (LiCo$_{0.8}$Si$_{0.2}$O$_2$) were prepared. For comparison, silicon-free conventional layer-like oxide LiCoO$_2$ was used as r2 of Example 4.

The batteries so prepared were abbreviated as batteries F1, F2 and R2 corresponding to the positive active materials f1, f2 and r2.

Figure 22:
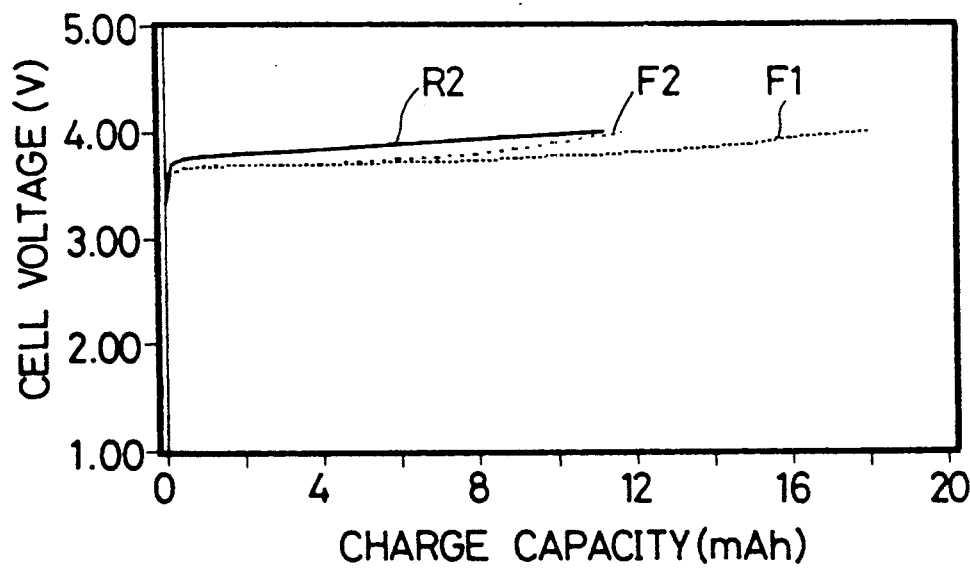
FIG. 22 is an explanatory view showing a comparison of the charging characteristics of the batteries of this invention and the prior art battery in the second cycle.
Figure 23:
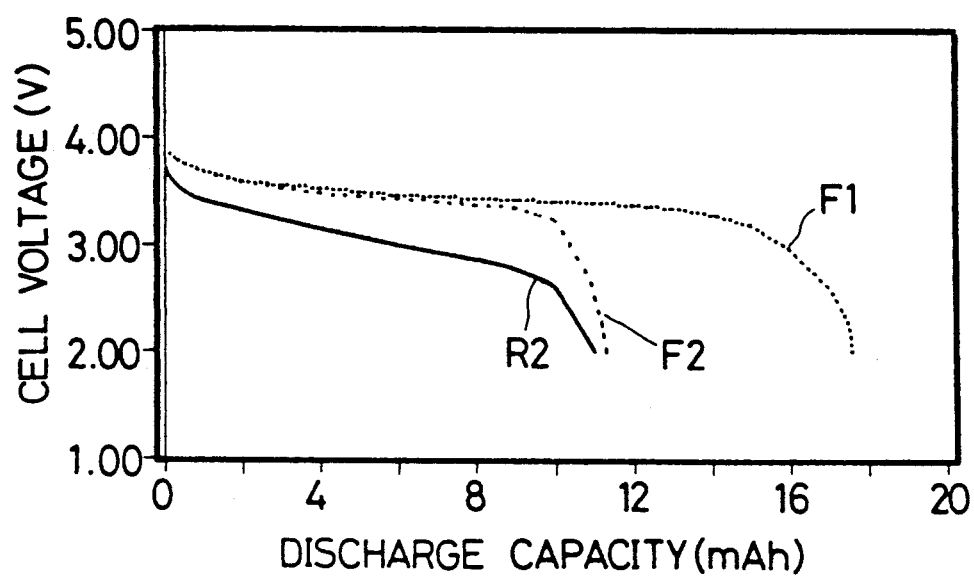
FIG. 23 is an explanatory view showing a comparison of the discharging characteristics of the batteries of this invention and the prior art battery in the second cycle.
Figure 24:
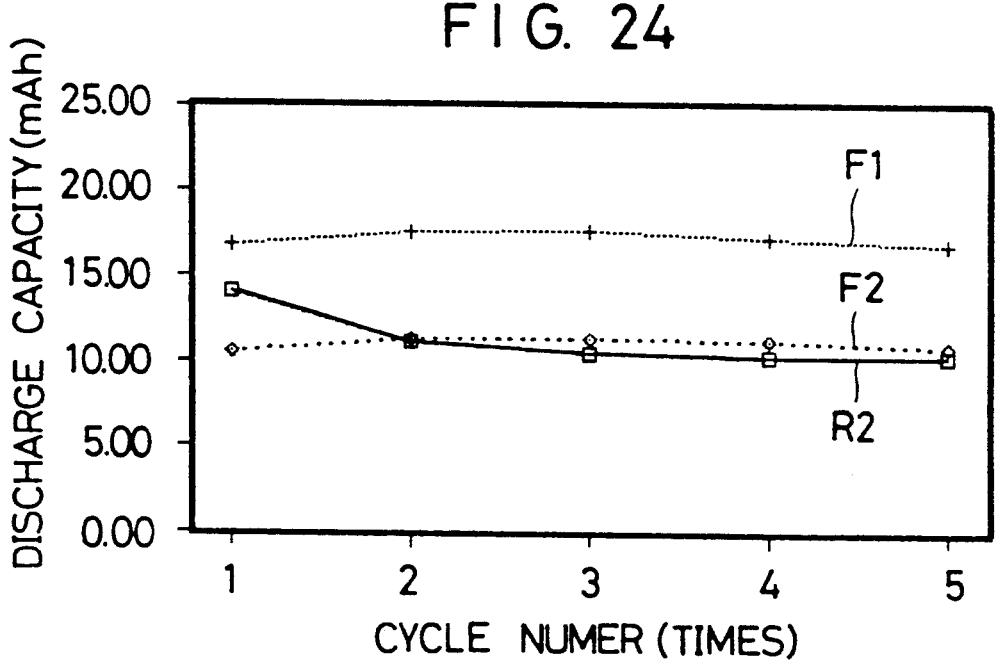
FIG. 24 is an explanatory view showing a comparison of the cycle characteristics of the batteries of this invention and the prior art battery.

These batteries F1, F2 and R2 were subjected to a charging-discharging cycle at a fixed current of 1 mA under a charging termination voltage of 4.0 V and a discharging termination voltage of 2.0 V. The charging characteristics in the second cycle are shown in FIG. 22, and the discharging characteristics in the second cycle are shown in FIG. 23. The cycle characteristics are shown in FIG. 24. The charging-discharging cycle was started with charging. As is clear from FIGS. 22 to 24, the batteries F1 and F2 have much larger charging-discharging capacity than the comparative battery R2, and the reversible region of charging-discharging is widened. The decrease in discharging capacity (cycle deterioration) by the repetition of charging and discharging is extremely small. Furthermore, throughout the entire charging-discharging region, the charging voltage is 0.2 to 0.3 V lower. Conversely, the operating voltage of discharging is extremely high, and the polarization (internal resistance) of the battery is greatly improved. Charging and discharging at a large current are very easy. This is because in the layer-like composite oxide Li$_x$Co$_y$Si$_z$O$_2$ as a positive active materials of the batteries of this invention, the inclusion of silicon Si in the crystal structure changed the crystal structure and electron state and enhanced the conductivity of the Li ion. Thus, intercalation and deintercalation of the Li ion are assumed to become easy.

If the amount z of silicon is too much, the charging-discharging capacity decreases. Since it becomes maximum at $0<z<0.5$, this range is preferred especially.

Although in this Example Si was explained as the metalloid element of Group IVA, other metalloid elements and semimetal elements of Group IVA such as carbon (C) and germanium (Ge) would give the same effect as in this Example.

EXAMPLE 7

In this Example, Mg as an alkaline earth metal was used as the L element constituting the positive active materials. Except for the positive active element, the batteries were produced in the same way as in Example 4.

The positive active materials were produced in the following manner. Lithium hydroxide LiOH.H$_2$O, cobalt carbonate CoCO$_3$ and magnesium oxide MgO were weighed in a specified mole ratio of Li:Co:Mg. The mixture was fully mixed in a mortar, heated in air at a temperature of 850° C. for 12 hour, and after cooling, pulverized to a particle size of smaller than 53 μm. This heating and pulverization were repeated two times to synthesize the positive active materials. In this Example, two mole ratios of Li:Co:Mg were prepared, namely (g1) 1:0.95:0.05(LiCo$_{0.95}$Mg$_{0.05}$O$_2$) and (g2)

1:0.8:0.2($LiCo_{0.8}Mg_{0.2}O_2$). For comparison, r2 of Example 4 was used as a magnesium-free conventional layer-like oxide $LiCoO_2$.

The prepared batteries were abbreviated as G1, G2 and R2 corresponding to the positive active materials g1, g2 and r2.

Figure 25:
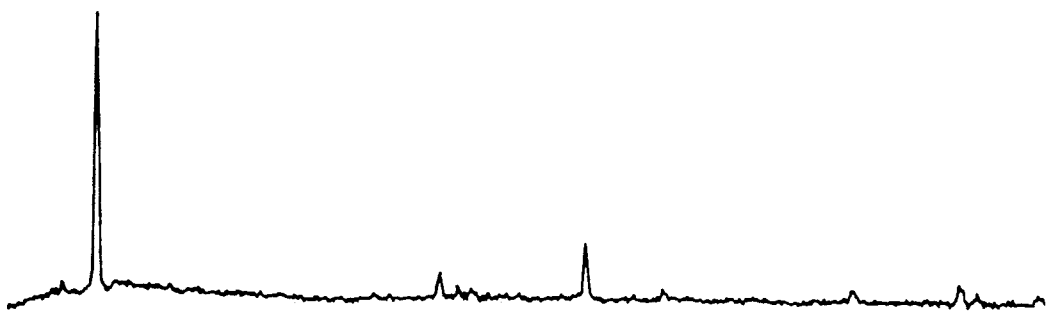
FIG. 25 is an explanatory view showing the powder X-ray diffraction patterns of the various positive active material.
Figure 25:
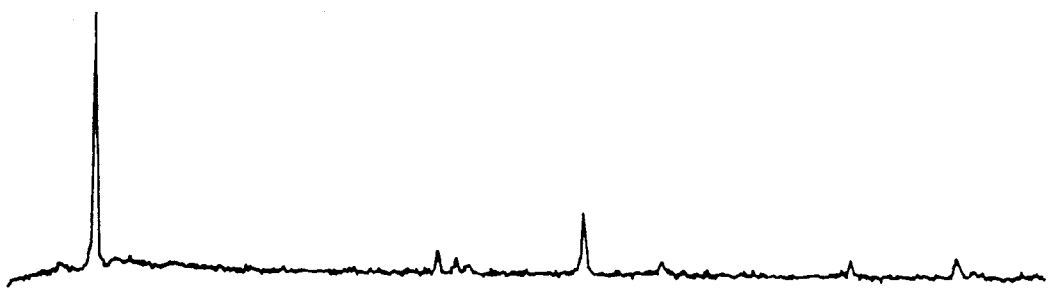
Figure 25:
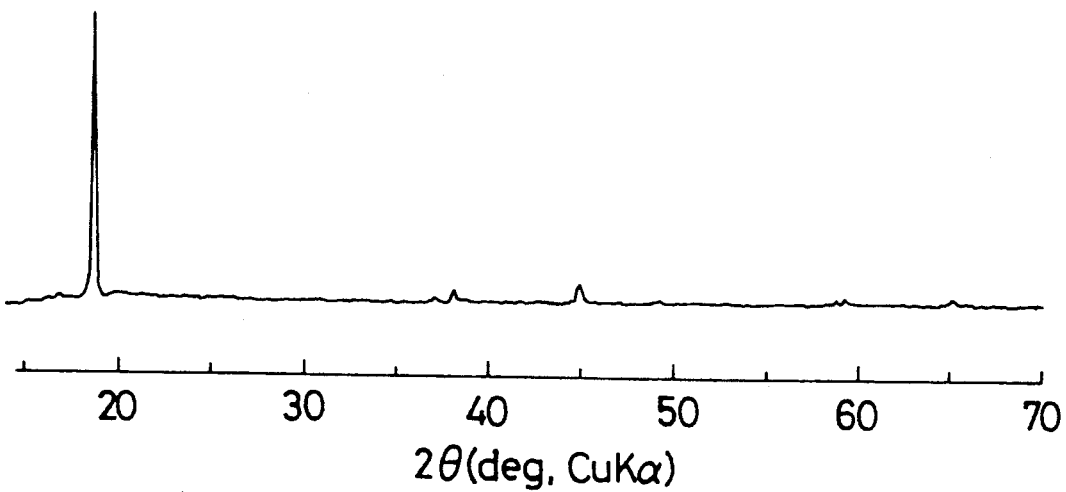

FIG. 25 shows X-ray diffraction patterns using Cuk$^\alpha$ rays of the positive active materials g1 and g2 and the conventional comparative material r2. As is apparent from the drawing, the diffraction pattern of the comparative material r2 agrees with the $LiCoO_2$ having an $\alpha$-$NaCrO_2$-type layer-like structure corresponding to ASTM card No. 16-427. On the other hand, the diffraction patterns of the active materials g1 and g2 of the invention are very similar to the diffraction pattern of the comparative active material $LiCoO_2$. No new unknown diffraction peak is seen. But the diffraction peak positions are shifted somewhat to a lower angle side. The active material g2 having a larger magnesium content z is shifted more than the active material g1 having a smaller magnesium content z. A difference is seen in the relative strengths of the diffraction peaks, and this difference becomes larger as the content of magnesium Mg is larger. Hence, the active materials of this invention g1 and g2 have such a structure that a part of the Co atoms in the oxide $LiCoO_2$ having an $\alpha$-$NaCrO_2$ type layer-like structure are replaced by magnesium atoms Mg, and the interlayer spaces of the crystal are widened. It is estimated that most of the Mg atoms are placed in the sites substituted for Co atoms, and very few of them are entered in the interstices of crystal lattices or in the Li sites. The active materials g1 and g2 in this Example are judged to be lithium-magnesium transition metal composite oxide having the compositions $LiCo_{0.95}Mg_{0.05}O_2$ and $LiCo_{0.8}Mg_{0.2}O_2$, similar to $\alpha$-$NaCrO_2$ type layer-like structure.

Figure 26:
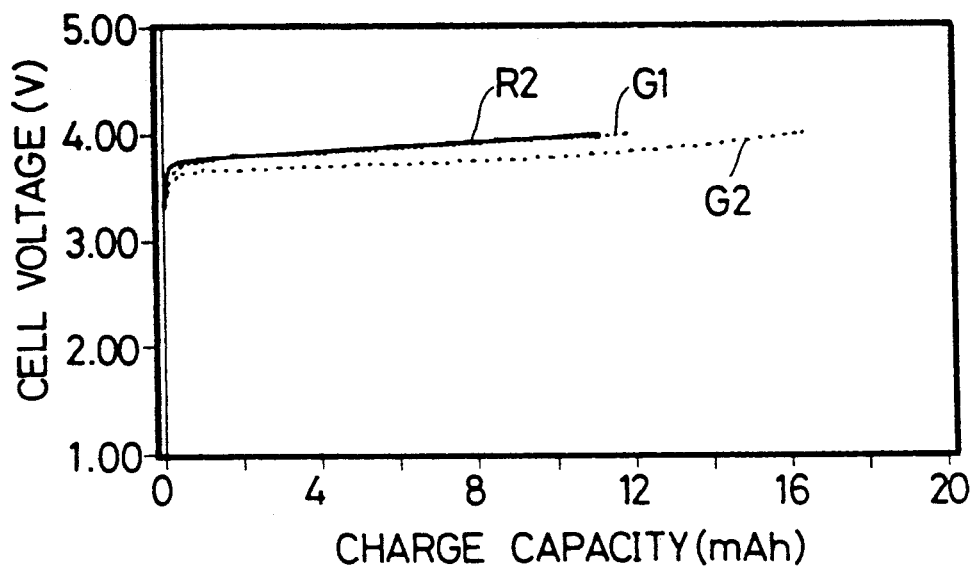
FIG. 26 is an explanatory view showing a comparison of the charging characteristic of the batteries of this invention and the prior art battery in the second cycle.
Figure 27:
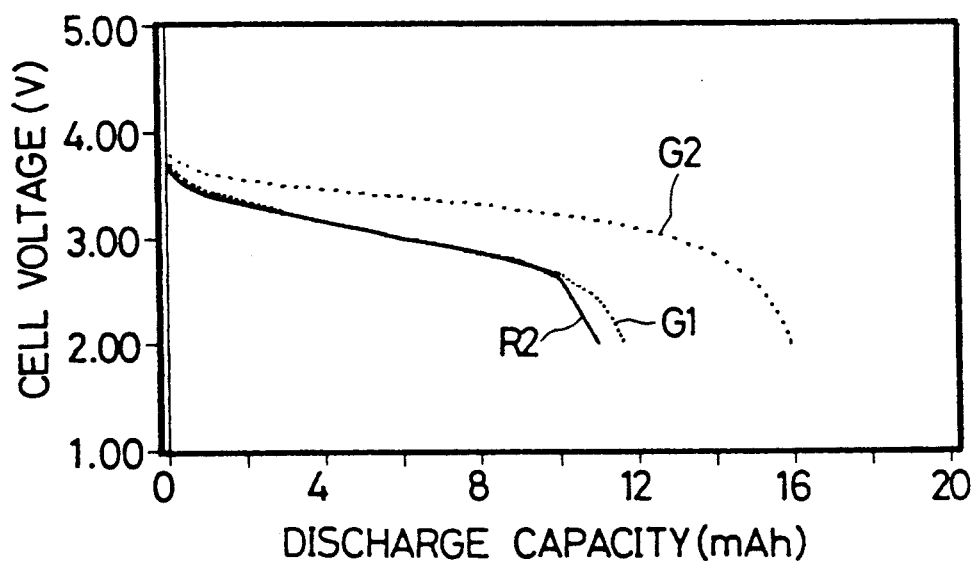
FIG. 27 is an explanatory view showing a comparison of the discharging characteristics of the batteries of this invention and the prior art battery in the second cycle.

These batteries G1, G2 and R2 were subjected to a charging-discharging test at a fixed current of 1 mA under a charging termination voltage of 4.0 V and a discharging termination voltage of 2.0 V. The charging characteristics of the second cycle are shown in FIG. 26, and the discharging characteristics of the second cycle are shown in FIG. 27. The charging-discharging test was started with charging. As is clear from FIGS. 26 and 27, the batteries G1 and G2 have much larger charging-discharging capacity than the comparactive battery R2, and the reversible region of charging and discharging is widened very greatly. Throughout the charging-discharging region, the charging voltage is low. Conversely, the operating voltage of discharging is extremely high. It is seen that the polarizations (internal resistance) of the batteries were very much improved, and charging and discharging at a large current became easy. Furthermore, these effects depend greatly upon the content z of magnesium, and it is markedly seen in the battery G2 wherein $0.05 < z$ than in the battery G1 which has a small z. This is because in the layer-like composite oxide $Li_xCo_yMg_zO_2$, the inclusion of magnesium widens the interlayer spaces of the crystal and a change occurs in crystal structure and electron state. It is estimated that as a result, the conductivity of the Li ion is enhanced, and the intercalation and deintercalation of the Li ion become easy.

In the present Example, magnesium was explained as an alkaline earth metal, but with other alkaline earth metals such as Be, Ca, Sr, Ba and Ra, the same effect as in this Example can be obtained.

EXAMPLE 8

In this Example, phosphorus P as a nonmetal element of Group VA of the periodic table was used as the L element constituting the positive active material. Except for the positive active materials, batteries were produced as in Example 4.

The positive active materials in this Example were produced in the following manner. Lithium hydroxide $LiOH.H_2O$, cobalt carbonate $CoCO_3$ and phosphorus pentaoxide $P_2O_5$ in a specified mole ratio of Li:Co:P were weighed, and mixed fully in a mortar and the mixture was heated in air at a temperature of 850° C. for 12 hours. After cooling, the mixture was pulverized to a particle size of smaller than 53 $\mu$m. This heating and pulverization were repeated two times to synthesize the positive active materials.

In this Example, the products were prepared in two mole ratios of Li:Co:P, namely (h1)1:0.95:0.05($LiCo_{0.95}P_{0.05}O_2$) and (h2) 1:0.8:0.2 ($LiCo_{0.8}P_{0.2}O_2$). For comparison, phosphorus-free conventional layer-like oxide $LiCoO_2$ according to Example 4, r2 was used.

The batteries produced are abbreviated as batteries H1, H2 and R2 corresponding to the positive active materials h1, h2 and r2.

Figure 28:
FIG. 28 is an explanatory view showing a comparison of the powder X-ray diffraction patterns of the various positive active materials.
Figure 28:
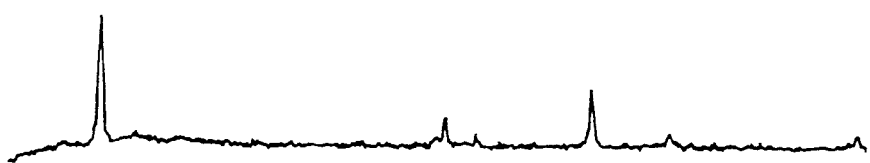
Figure 28:
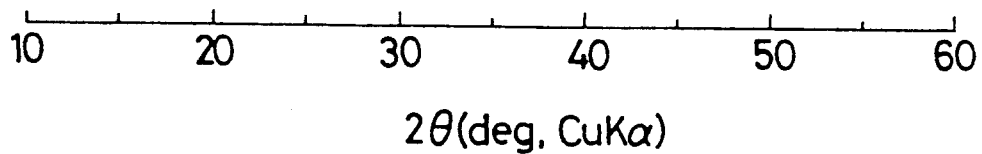

FIG. 28 shows X-ray diffraction patterns using Cuk$^\alpha$ rays of the positive active material h1 of the present invention produced as above and the conventional comparative material r2 of the conventional method. As is apparent from the drawing, the diffraction pattern of the comparative active material r2 agreed with $LiCoO_2$ having an $\alpha$-$NaCrO_2$ type layer-like structure according to ASTM card No. 16-427. On the other hand, the diffraction pattern of the active material h1 in accordance with the present invention is very similar to the diffraction pattern of the active material $LiCoO_2$. A small peak assumed to be the satelight peak is seen at a lower angle side of the diffraction peak at $2\theta \approx 37.3°$, and no unknown new diffraction peak is seen. But marked differences are seen in the relative strengths of the difration peak. Diffraction strengths from faces (003) and (006) perpendicular to the c-axis of the hexagonal system such as $2\theta \approx 18.8°$ and 38.3° are relatively smaller than the diffraction strengths from other faces. Accordingly, in the active materials h1 and h2, a part of the Co atoms in the oxide $LiCoO_2$ having an $\alpha$-$NaCrO_2$ type layer-like structure are replaced by phosphorus atoms P. The crystal structure has P atoms and most of the P atoms are at positions substituted for Co atoms (Co site). It is estimated that a few are at the interstices among crystal lattices or in the Li sites. The active materials h1 and h2 have a layer-like structure similar to the $\alpha$-$NaCrO_2$ type and are judged to be lithium-phosphorus transition metal composite oxides having the compositions of $LiCo_{0.95}P_{0.05}O_2$ and $LiCo_{0.8}P_{0.2}O_2$.

Figure 29:
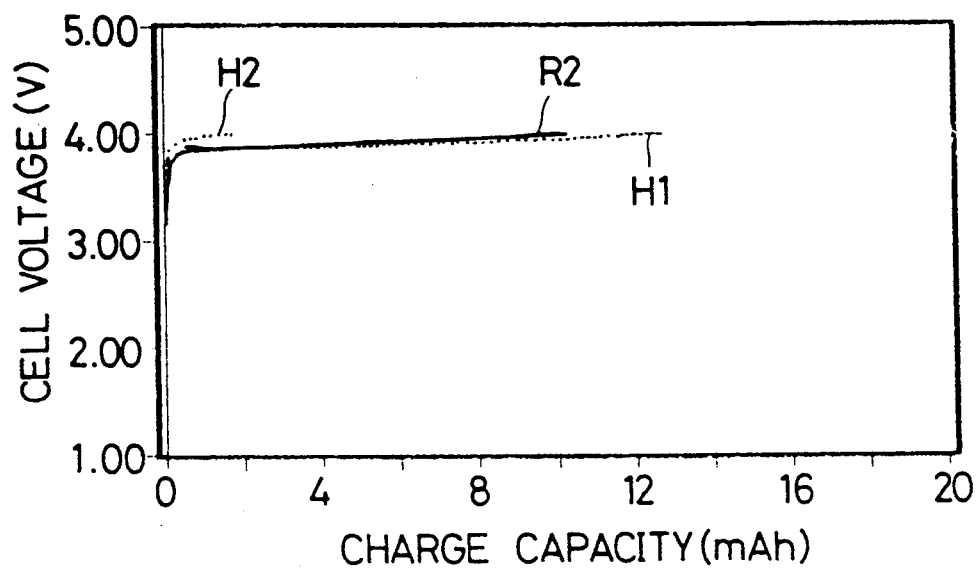
FIG. 29 is an explanatory view showing a comparison of the charging characteristics of the batteries of this invention and the prior art battery in the 5th cycle.
Figure 30:
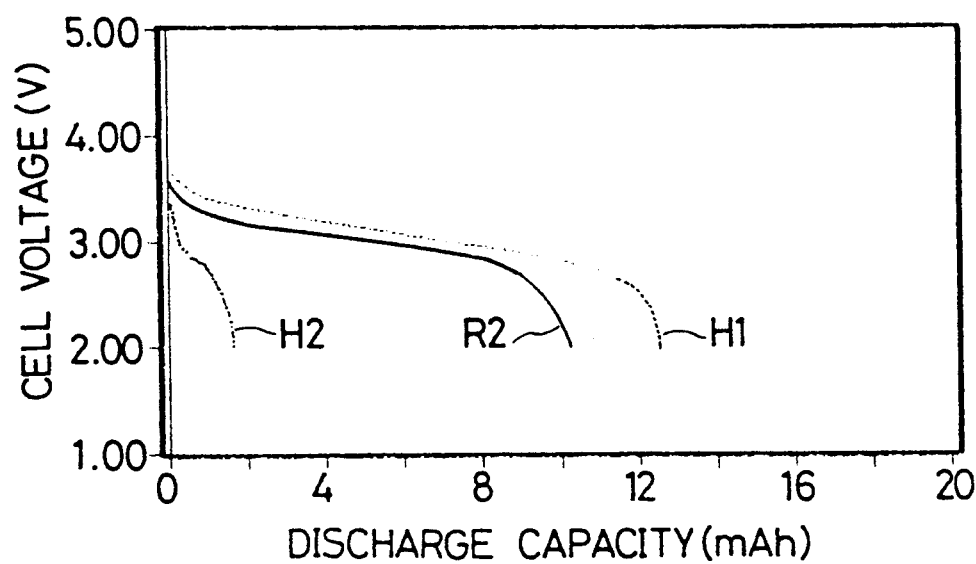
FIG. 30 is an explanatory view showing a comparison of the discharging characteristics of the batteries of this invention and the prior art battery in the 5th cycle.
Figure 31:
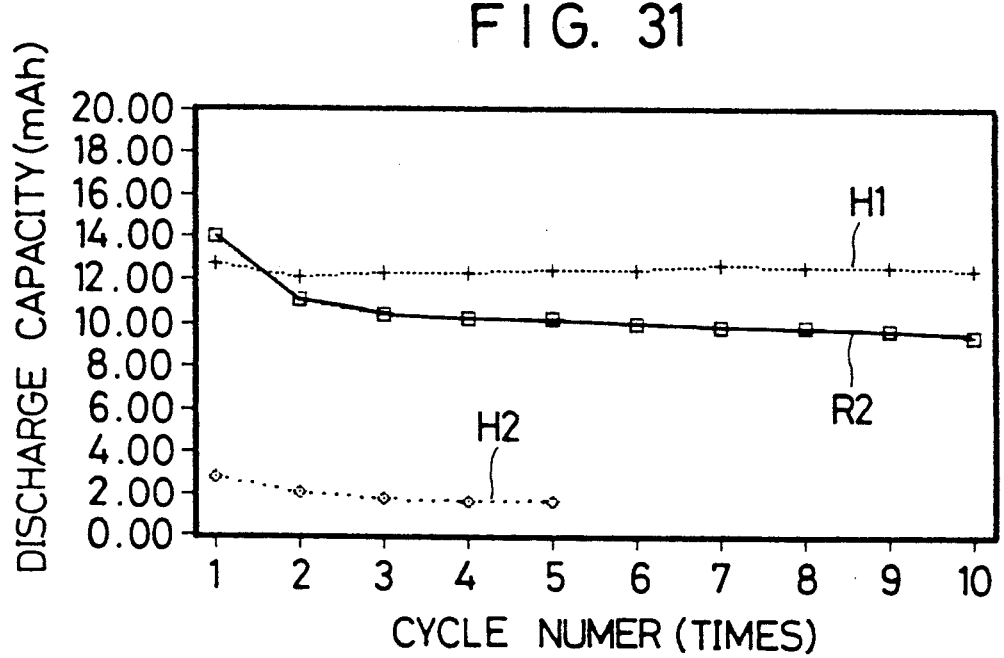
FIG. 31 is an explanatory view showing a comparison of the cycle characteristics of the batteries of this invention and the prior art battery.

These batteries H1, H2 and R2 were subjected to a charging-discharging cycle at a fixed current of 1 mA, a charging termination voltage of 4.0 V and a discharging termination voltage of 2.0 V. The charging characteristics in the 5th cycle are shown in FIG. 29, and the discharging characteristics in the 5th cycle are shown in FIG. 30. The cycle characteristics are shown in FIG. 31. The charging-discharging cycle started with charging. As can be seen from FIGS. 29 to 31, the battery H1 of this invention has much larger charging-discharging capacity than the comparative material R2, and the reversible region of charging-discharging is greatly widened. The decrease of discharging capacity (cycle deterioration) by the repetition of charging and discharging is very small. Furthermore, at the entire charging-discharging region, the charging voltage is low, and conversely, the operating voltage of discharging is extremely high. The polarization (internal resistance) of the battery is very much improved, and charging and discharging at a large current become easy. This is because in the layer-like composite oxide $Li_xCo_yP_zO_2$ as a positive active material of the battery H1 in accordance with this invention, the inclusion of phosphorus P in the crystal structure changed the crystal structure and electron state and enhanced the conductivity of the Li ion. It is therefore estimated that the intercalation and deintercalation became easy.

On the other hand, these effects greatly depend upon the amount z of phosphorus P. The charging-discharging capacity was lowered in the battery H2 in which the amount z of phosphorus was 0.2. It became the greatest in $0<z<0.2$, and, therefore, this range is preferred.

In the Examples, the negative electrode was shown only as the lithium-aluminum alloy. But the invention is not limited to the Examples. Lithium absorbing and releasing compounds, for example, metallic lithium, alloys of lithium and other metals such as Zn,Sn,Pb,or-/and Bi, lithium-insertion compounds such as carbon, $MoO_2$, $Wo_2$ or $Fe_2O_3$, and conductive polymers capable of doping an Li ion such as polyacetylene, polypyrrole or polyacene, can be also used in the same manner. The negative active material does not necessarily contain Li at the time of producing a battery. After assembling the battery, an Li ion in the electrolyte may be charged or an Li ion deintercalated from the positive active material may be absorbed into the negative electrode.

Only Co and Ni were shown as the transition metal element M in the layer-like composite oxide $Li_xM_yL_zO_2$. The other transition metals such as Cr, Fe, Mn and V may be applied in the same manner.

As stated in detail above, the present invention uses a novel layer-like composite oxide $Li_xM_yL_zO_2$(M is a transition metal) containing at least the L element which is one or more elements selected from the group consisting of nonmetal, metalloid and semimetal elements selected from Groups IIIA, IVA and VA of the periodic table, alkaline earth metal elements and metal elements selected from Zn and Cu. Deintercalation and intercalation of an Li ion at the time of charging and discharging become easy, and its effective charging-discharging capacity is markedly enhanced. Furthermore, the charging voltage is decreased and the operating voltage at the time of discharging is enhanced. Thus, excellent effects can be attained such as charging and discharging characteristics are markedly improved at a large current, and by the repetition of charging and discharging, cycle deterioration such as the decrease of charging and discharging capacities can be markedly reduced.

What is claimed is:

1. A nonaqueous electrolyte secondary battery comprising: a negative electrode having lithium or a material capable of absorbing and releasing lithium as an active material; a lithium ion conductive nonaqueous electrolyte; and a positive electrode having an active material composed of a layer-like structure composite oxide $$Li_xM_yL_zO_2 \qquad (1)$$

wherein M is one or more transition metal elements selected from Groups IIIB, IVB, VB, VIB, VIIB and VIII of the periodic table and L is one or more elements selected from the group consisting of nonmetal, metalloid and semimetal elements selected from Groups IIIA, IVB and VA of the periodic table, alkaline earth metal elements and metal elements selected from Zn and Cu, and x, y and z are $0 < x \leq 1.15$ and $0.85 \leq y+z \leq 1.3$ and $0 < z$.

2. A nonaqueous electrolyte secondary battery of claim 1; wherein the L element constituting the layer-like structure composite oxide of formula (1) comprises at least one nonmetal or metalloid element selected from boron B, silicon Si and phosphorus P.

3. A nonaqueous electrolyte secondary battery of claim 1; wherein the L element constituting the layer-like structure composite oxide of formula (1) comprises at least magnesium Mg.

4. A nonaqueous electrolyte secondary battery of claim 1; wherein the active material of the negative electrode comprises a metal which can be alloyed with lithium, an alloy of lithium and a metal or a metal which can be alloyed with lithium and lithium which are laminated together.

5. A nonaqueous electrolyte secondary battery of claim 4; wherein the metal which can be alloyed with lithium is aluminum.

6. A positive active material for use in a secondary cell having a negative active material composed of lithium or a material capable of absorbing and releasing lithium and a nonaqueous electrolyte capable of conducting lithium ions, the positive active material comprising: a composite oxide $$Li_xM_yL_zO_2 \qquad (1)$$

wherein M is one or more transition metal elements selected from Groups IIIB, IVB, VB, VIB, VIIB and VIII of the periodic table and L is one or more elements selected from the group consisting of nonmetal, metalloid and semimetal elements selected from Groups IIIA, IVA and VA of the periodic table, alkaline earth metal elements and metal elements selected from Zn and Cu, and x, y and z are $0 < x \leq 1.15$ and $0.85 \leq y+z \leq 1.3$ and $0 < z$.

7. A positive active material according to claim 6; wherein the L element constituting the composite oxide of formula (1) comprises at least one nonmetal or metalloid element selected from boron B, silicon Si and phosphorus P.

8. A positive active material according to claim 6; wherein the L element constituting the composite oxide of formula (1) comprises at least magnesium Mg.

9. A secondary cell which includes the positive active material according to claim 6; wherein the secondary cell has a negative active material comprising a metal which can be alloyed with lithium, an alloy of lithium and a metal or a metal which can be alloyed with lithium and lithium which are laminated together.

10. A secondary cell according to claim 9; wherein the metal which can be alloyed with lithium is aluminum.

* * * * *